(12) United States Patent
Han et al.

(10) Patent No.: US 10,019,129 B2
(45) Date of Patent: Jul. 10, 2018

(54) IDENTIFYING RELATED ITEMS ASSOCIATED WITH DEVICES IN A BUILDING AUTOMATION SYSTEM BASED ON A COVERAGE AREA

(71) Applicant: Siemens Schweiz AG, Zurich (CH)

(72) Inventors: James K. Han, Long Grove, IL (US); Patrick Stirnemann, Besenburen (CH); Andreas Hersche, Island Lake, IL (US)

(73) Assignee: SIEMENS SCHWEIZ AG, Zurich (CH)

( * ) Notice: Subject to any disclaimer, the term of this patent is extended or adjusted under 35 U.S.C. 154(b) by 301 days.

(21) Appl. No.: 14/827,076

(22) Filed: Aug. 14, 2015

(65) Prior Publication Data
US 2017/0046012 A1 Feb. 16, 2017

(51) Int. Cl.
| | |
|---|---|
| *G06F 3/0481* | (2013.01) |
| *G06F 3/0484* | (2013.01) |
| *G06Q 30/00* | (2012.01) |
| *G06Q 10/00* | (2012.01) |
| *G08B 13/196* | (2006.01) |

(52) U.S. Cl.
CPC ........ *G06F 3/0481* (2013.01); *G06F 3/04842* (2013.01); *G06F 3/04847* (2013.01); *G06Q 10/00* (2013.01); *G06Q 30/00* (2013.01); *G08B 13/19682* (2013.01)

(58) Field of Classification Search
CPC ............... G06F 3/0481; G06F 3/04842; G08B 13/19682
See application file for complete search history.

(56) References Cited

U.S. PATENT DOCUMENTS

| | | | | |
|---|---|---|---|---|
| 2003/0218638 | A1* | 11/2003 | Goose | G01C 21/20 715/850 |
| 2005/0260973 | A1* | 11/2005 | van de Groenendaal | H04L 63/102 455/411 |
| 2007/0099623 | A1* | 5/2007 | Stephensen | H04W 4/02 455/446 |
| 2008/0270172 | A1* | 10/2008 | Luff | G06Q 30/02 705/1.1 |

(Continued)

OTHER PUBLICATIONS

Canadian Office Action dated Jun. 1, 2017, for CA Application No. 2,938,693, 6 pages.

*Primary Examiner* — Omar R Abdul-Ali

(57) ABSTRACT

Management systems, methods and mediums are provided. A method includes displaying a building layout graphic, receiving a request to generate a coverage area graphic associated with a monitoring device, generating the coverage area graphic, and displaying the coverage area graphic relative to the building layout graphic. The method also identifies a device having a data point to be monitored by the data processing system, and determines whether the identified device is in the coverage area represented by the coverage area graphic. In response to determining that the identified device is in the coverage area, the method further includes storing a related item identifier associated with the one or more monitoring devices in association with an object corresponding to the identified device. The method receives a selection for the identified device and, in response, displays one or more related item identifiers associated with the one or more monitoring devices.

14 Claims, 29 Drawing Sheets

(56) References Cited

U.S. PATENT DOCUMENTS

| | | | | |
|---|---|---|---|---|
| 2009/0307255 | A1* | 12/2009 | Park | G06Q 10/10 |
| 2010/0201488 | A1* | 8/2010 | Stern | G06K 7/0008 |
| | | | | 340/10.1 |
| 2011/0080267 | A1* | 4/2011 | Clare | G01S 13/82 |
| | | | | 340/10.4 |
| 2011/0137853 | A1* | 6/2011 | Mackay | G06Q 10/06 |
| | | | | 706/57 |
| 2013/0083012 | A1* | 4/2013 | Han | G05B 15/02 |
| | | | | 345/419 |
| 2016/0373639 | A1* | 12/2016 | Westmacott | H04N 5/23206 |
| 2017/0089739 | A1* | 3/2017 | Gallo | G08B 21/18 |

* cited by examiner

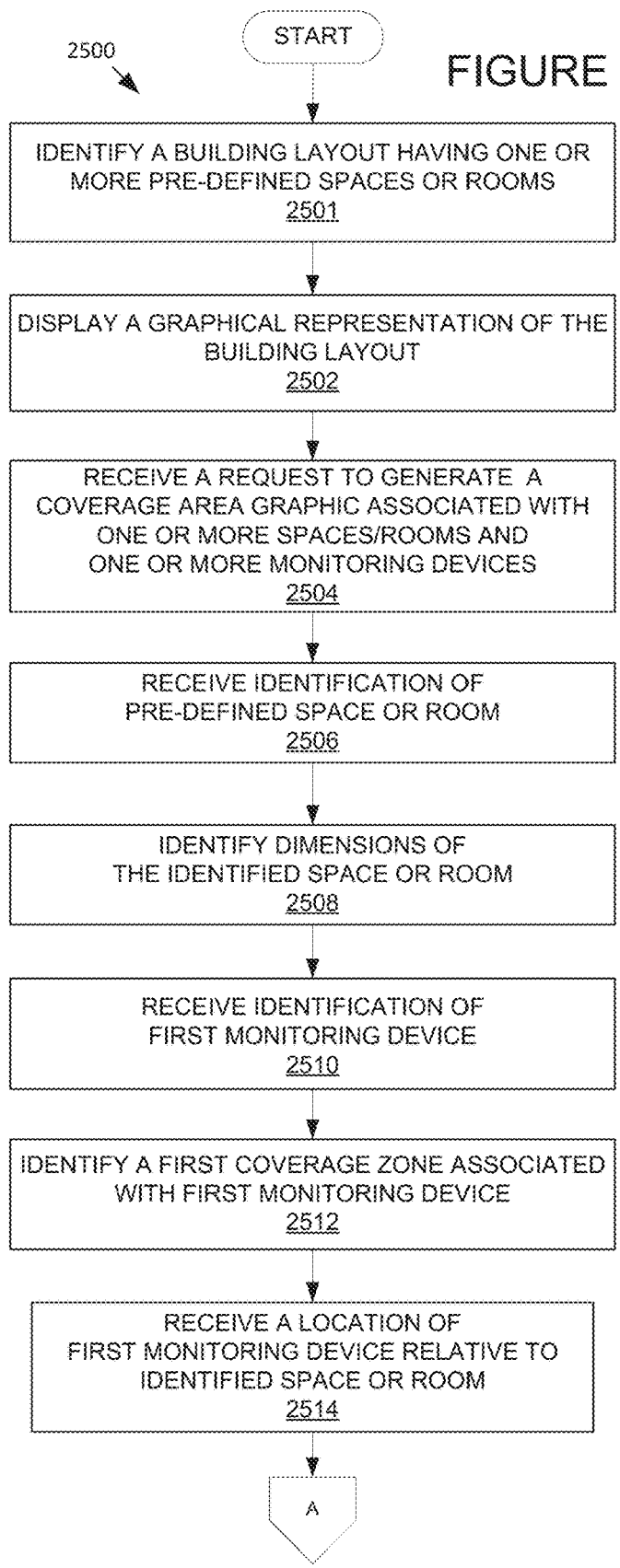

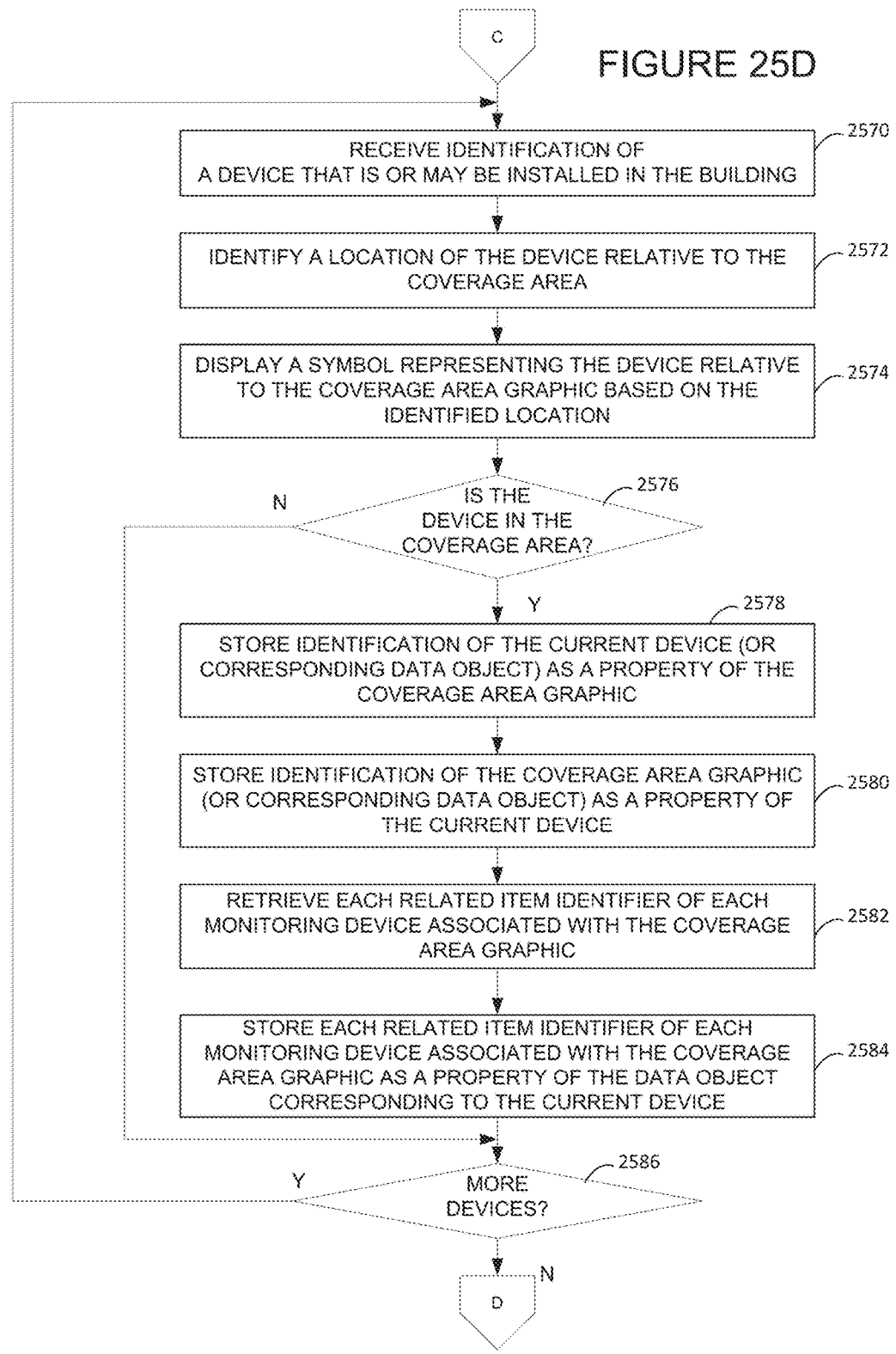

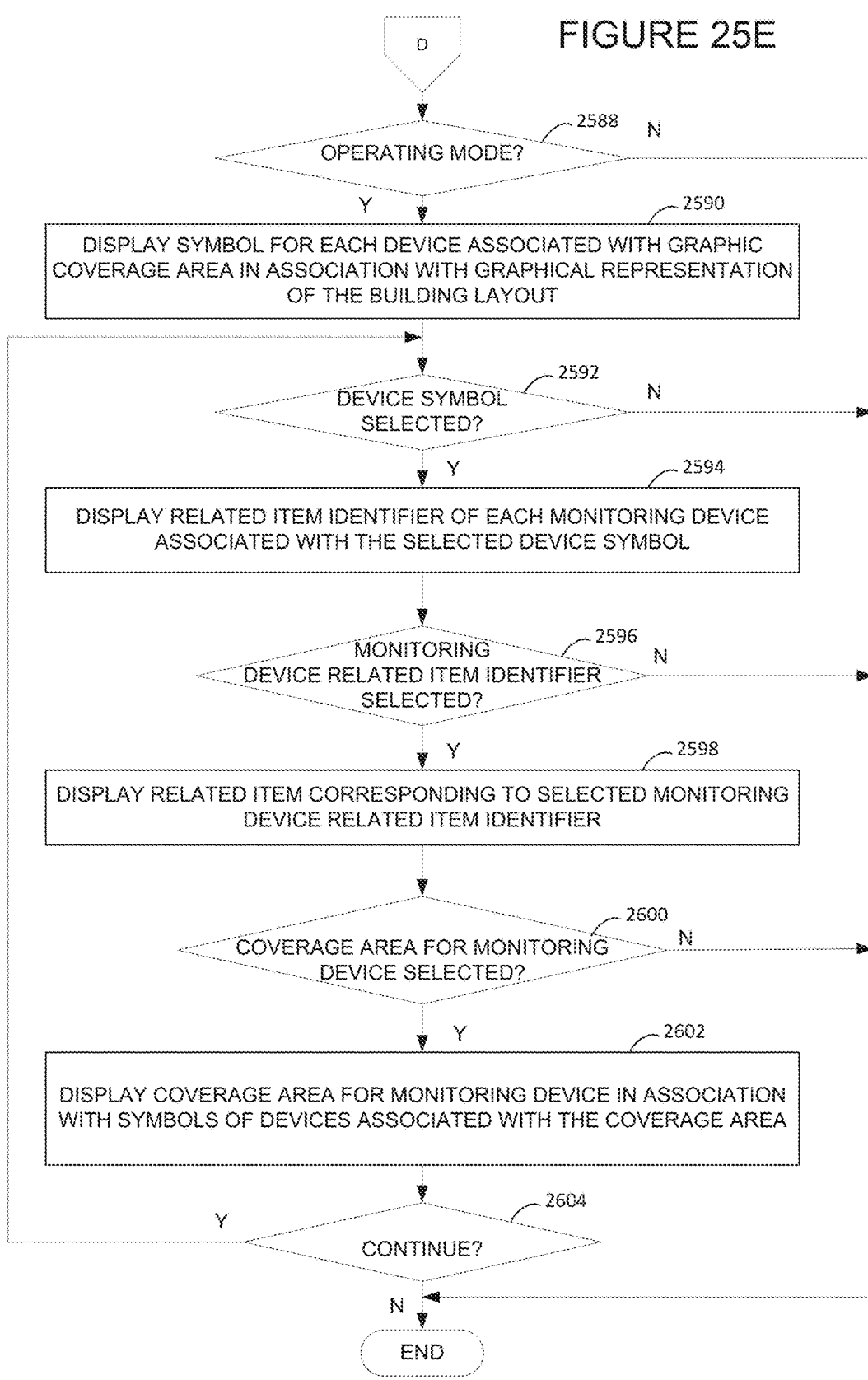

IDENTIFYING RELATED ITEMS ASSOCIATED WITH DEVICES IN A BUILDING AUTOMATION SYSTEM BASED ON A COVERAGE AREA

TECHNICAL FIELD

The present disclosure is directed, in general, to management systems and, more particularly, to identifying related items associated with devices in a building automation system based on a coverage area associated with one or more monitoring devices, defined by a user in relation to a graphical layout of a room or space, or combination of the foregoing.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors, video cameras and alarm actuators dispersed throughout an entire building or campus. Fire safety systems also include widely dispersed devices in the form of smoke alarms, pull stations and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. Historically, management systems used to display and access data for monitoring and controlling operations of the building automation system have been relatively rigid in their user interface architecture. Because building automation systems are by nature unique to the layout and design of the particular building, maneuvering among displays of various elements of a complex, building automation system using a rigid user interface may be difficult and time consuming for building managers. Further, certain management operations of a building automation system may require that time sensitive information be delivered or identifiable in a timely manner.

An application framework is described in PCT Application Serial No. PCT/US2011/054141, entitled "Management System with Versatile Display" and U.S. patent application Ser. No. 13/609,364, titled "Management System Using Function Abstraction for Output Generation" (hereafter "the '364 Patent Application"). The application framework provides a user interface that includes a multi-pane display window that allows user selection of a graphic element corresponding to building device object in one pane and display of a "related item" associated with the building device object, where the "related item" may be a link to information about objects related to the selected building device object. For example, as described in the '364 Patent Application, the related items may include floor plan graphics for areas close to or involving the selected building device object or maintenance reports relating to that area. However, in the described application framework, the "related item" is manually pre-configured to be a identified as a property of the building device object or dynamically discovered by the application framework based on searching for schedules, reports, or the like that may reference the respective building device object. However, the application framework described in the '364 Patent Application is still limited or rigid in requiring manual pre-configuration or dynamic discover of "related items" to a building device object.

There is still a need, therefore, for an intuitive interface that allows for information to be delivered or identifiable in a timely manner.

SUMMARY OF THE DISCLOSURE

Various disclosed embodiments relate to systems and methods that may be employed in a data processing system for defining a coverage area associated with one or more monitoring devices in a management system in relation to a pre-defined space in a building and identifying devices located within the coverage area such that a system manager application may effectively identify and display related items associated with the devices.

Various embodiments include management systems, methods, and mediums. A method, which may be implemented in a data processing system for displaying graphics, includes displaying a graphical representation of a layout of a building having one or more spaces, receiving a request to generate a coverage area graphic associated with one or more monitoring devices, generating the coverage area graphic, and displaying the coverage area graphic relative to the graphical representation of the layout of the building. The method further includes identifying (e.g., via user input or a configuration file) a device having a data point to be monitored by the data processing system, determining whether the identified device is in the coverage area represented by the coverage area graphic, and storing a related item identifier associated with the one or more monitoring devices in association with an object corresponding to the identified device in response to determining that the identified device is in the coverage area. The method also includes receiving a selection for the identified device, and, in response to receiving the selection for the identified device, displaying the related item identifier associated with the one or more monitoring devices.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 25A-25E illustrates a flowchart of a process for defining a coverage area associated with one or more monitoring devices in the management system in relation to a pre-defined space in a building, identifying devices located within the coverage area, and displaying related items associated with one or more of the devices in accordance with disclosed embodiments.

DETAILED DESCRIPTION

FIGS. 1 through 25E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide a graphical user interface for a management station to enable defining a coverage area associated with one or more monitoring devices in the management system in relation to a pre-defined space in a building, identifying devices located within the coverage area, and displaying related items associated with one or more of the devices. Such a graphical user interface enables a user to define relationships between a coverage zone of a monitoring device to other devices within a pre-defined space such that when the other device reports an alert (i.e., such as smoke detector alarm), the user may readily view a related item of the monitoring device (such as a current camera image if the monitoring device is a camera, or a current temperature if the monitoring device is a room thermostat or temperature sensor).

Figure 1:
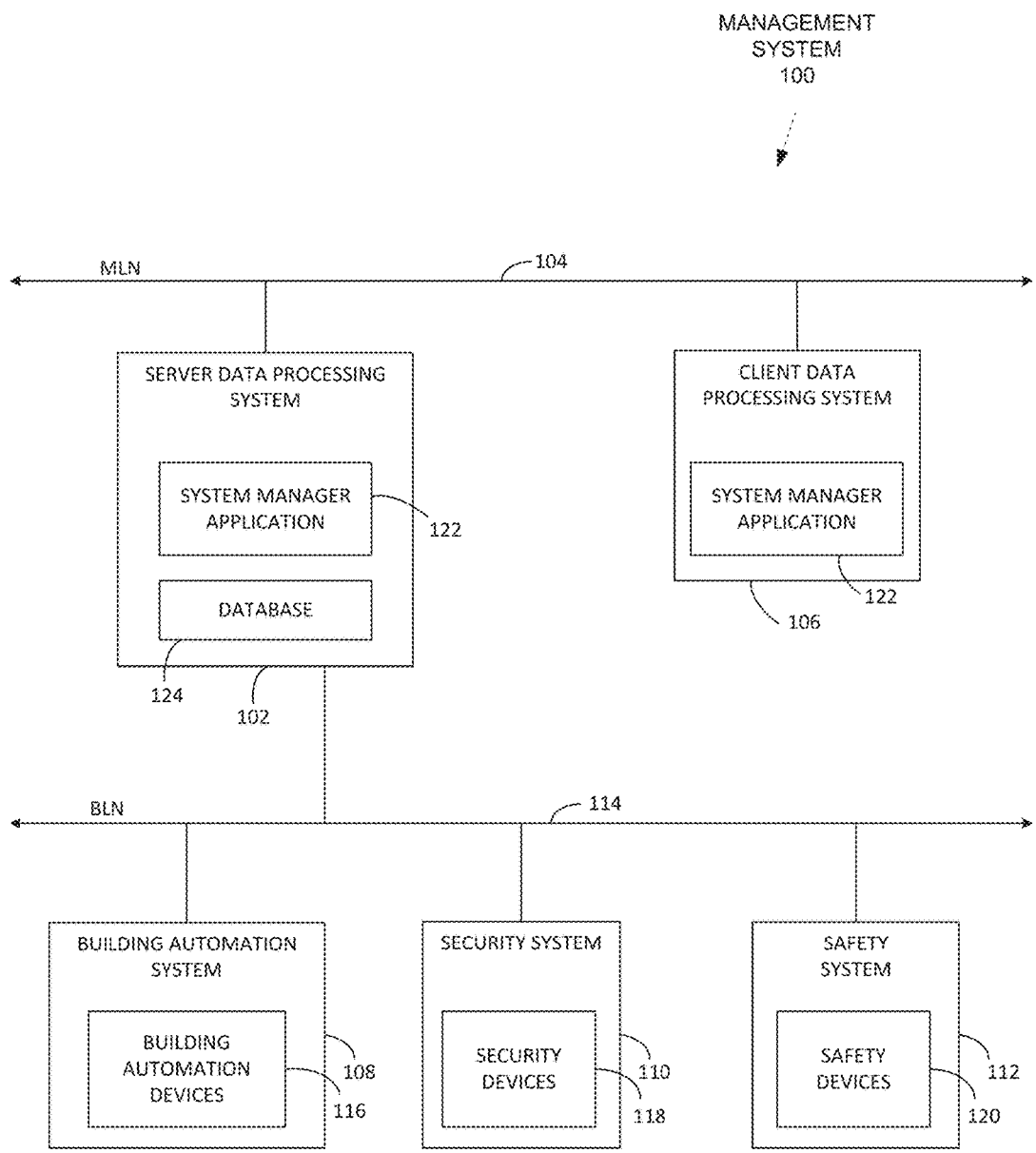
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security system devices 118 and safety system devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, control valves, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review and control various points and devices in the management system 100. The system manager application 122 may include, for example, without limitation, executable files, user-layout-definition files, graphics control modules, an infrastructure interface, and/or a number of software extensions. In some embodiments, system manager application 122 may be an application framework as described in U.S. patent application Ser. No. 13/609,364, titled "Management System Using Function Abstraction for Output Generation" that is improved to employ the aspects of the present invention as described herein.

The server data processing system 102 includes a database 124 that stores information about the devices 116-120 within the management system 100. The database 124 includes one or more data models of data points, devices, and other objects in the management system 100. For example, the database 124 may store values for devices in the BAS 108 (e.g., temperature, alarm status, humidity). These values may be referred to as a point or data point. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors and buildings managed by the management system 100.

In these illustrative embodiments, objects in the management system 100 (also referenced herein as "system objects", "building device objects" or "data objects") include anything that creates, processes or stores information regarding data points, such as physical devices (BAS controllers, field panels, sensors, actuators, cameras, etc.), and maintains data files, such as control schedules, trend reports, calendars, and the like.

In various embodiments, the database 124 includes hierarchy definitions that identify relationships between objects in the system. For example, a hierarchy may include a folder for a "floor" in a building with multiple child folders in the form of "rooms". Each "room" object, in turn, may have several child objects, such as "ventilation damper", "smoke detector", and "temperature sensor". Such hierarchy definitions among objects may employ conventional BACnet structures or may take other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those system or building device objects representative of the devices 116-120 (e.g., system or building device objects 250A-250N in FIG. 2).

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other system objects in the management system 100. An example of a suitable alarm propagation system is provided in U.S. patent application Ser. No. 12/566,891, filed Sep. 25, 2009, which is assigned to the assignee of the present invention and is incorporated by reference herein.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and corresponding objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
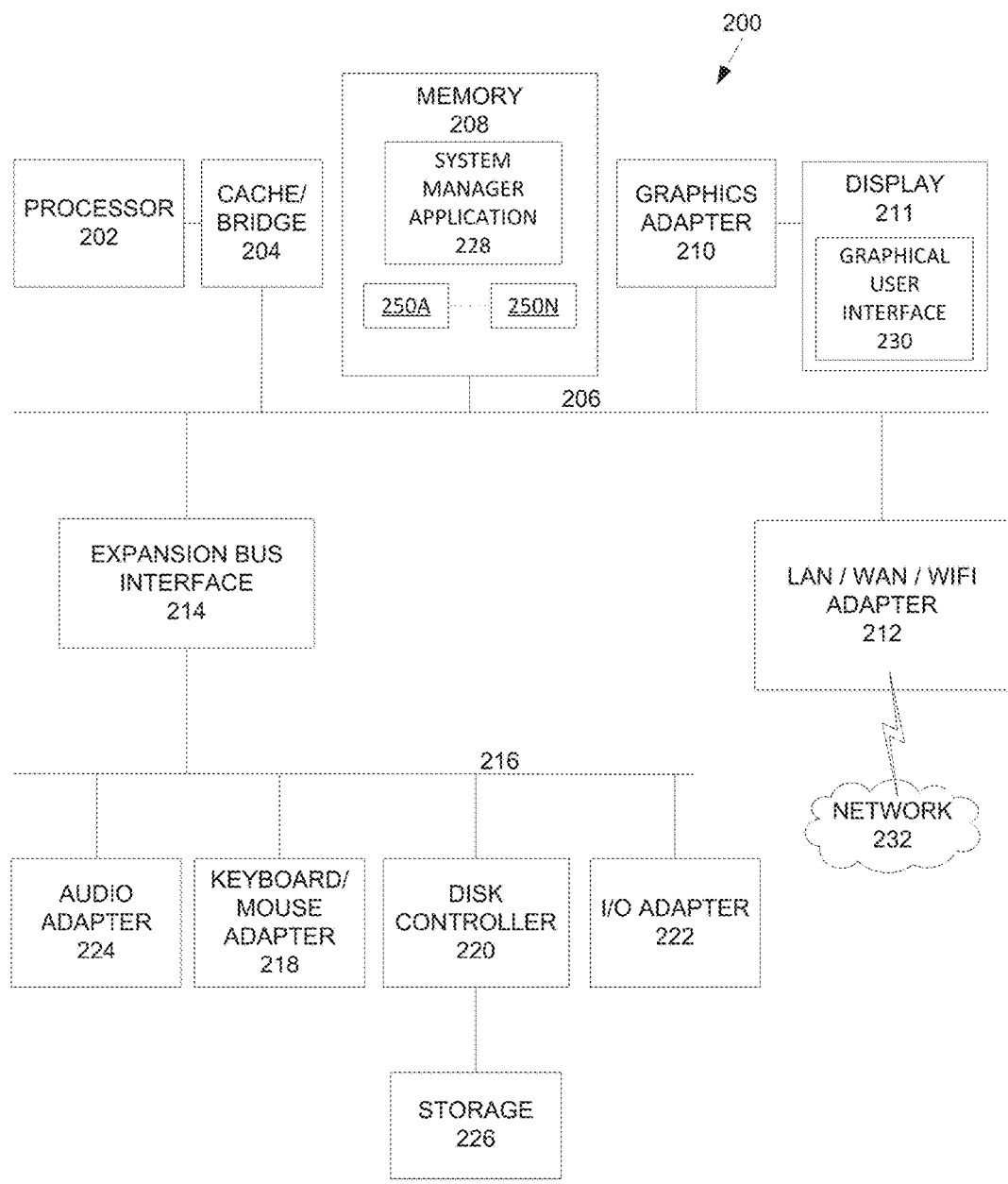
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/ Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EE-PROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as an installed workstation with a system manager application 228 installed in the memory 208. The system manager application 228 is an example of one embodiment of system manager application 122 in FIG. 1. For example, the processor 202 executes program code of the system manager application 228 to generate graphical user interface 230 displayed on display 211. In various embodiments of the present disclosure, the graphical user interface 230 includes a display of symbols representing devices inside or in proximity to one or more buildings managed by the management system 100. The graphical user interface 230 provides an interface for a user to view information and alerts for one or more devices, objects, and/or points within the management system 100. The system manager application 228 may retrieve from the database 124 system or building device objects 250A-250N corresponding to devices and/or points within the management system 100 that are currently represented graphically or by identifiers via the graphical user interface as further described herein. The graphical user interface 230 also provides an interface that is customizable to present the information and alerts in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement graphic symbol animations with evaluations for building automation graphics.

LAN/WAN/Wifi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system 200.

Figure 3:
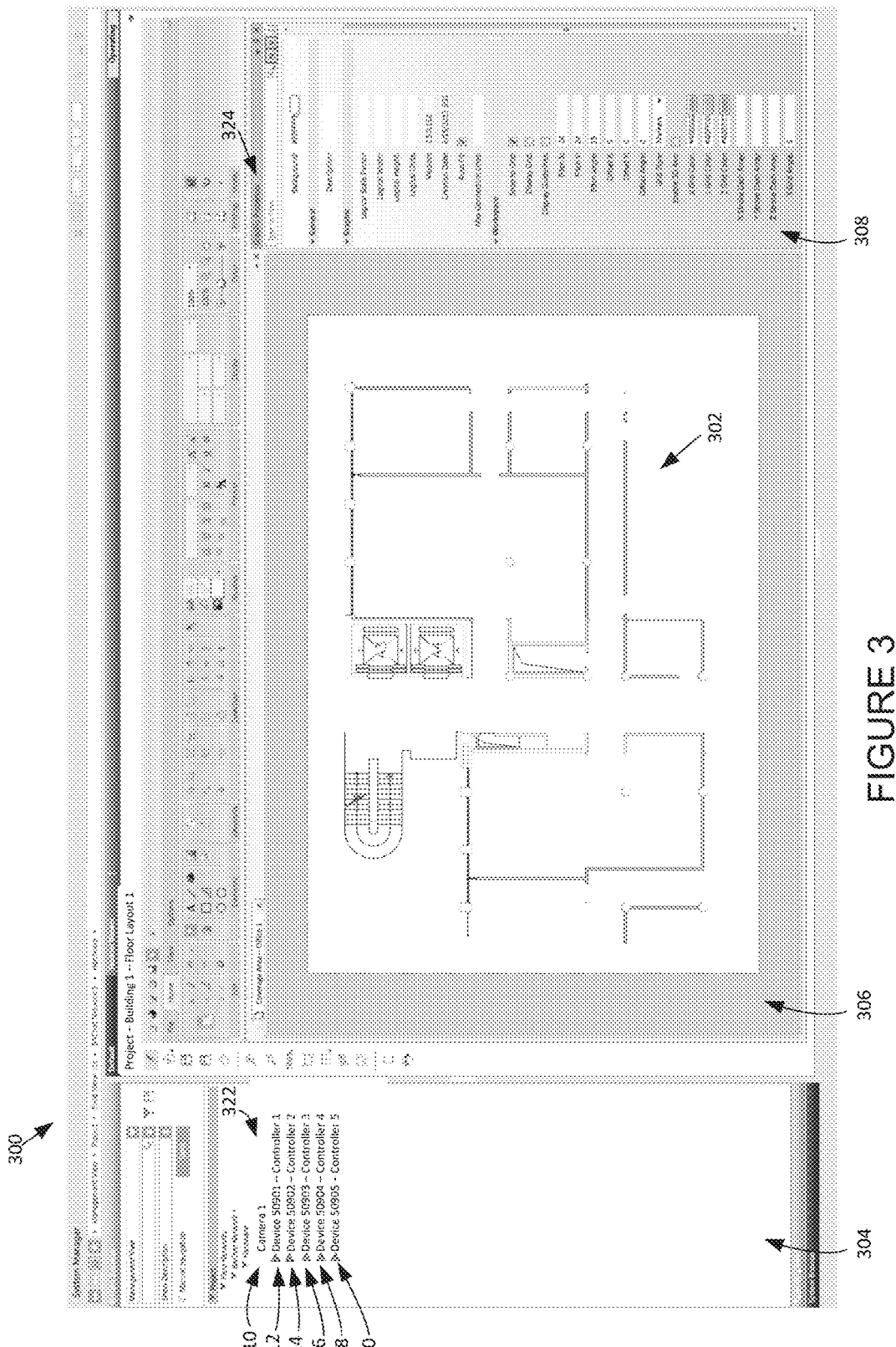
FIG. 3 illustrates a graphical user interface that may be employed in the data processing system for defining a coverage area associated with one or more monitoring devices in the management system in relation to a pre-defined space in a building and identifying devices located within the coverage area such that a system manager application may identify and display related items associated with the devices in accordance with disclosed embodiments.

FIG. 3 illustrates a graphical user interface 300 that may be employed in the data processing system for defining a coverage area associated with one or more monitoring devices in the management system in relation to a predefined space in a building in accordance with disclosed embodiments. In this illustrative embodiment, the graphical user interface 300 is an example of one interface generated by the data processing system 200 and the system manager application 228. In this illustrative embodiment, the graphical user interface 300 comprises a multi-area or multi-pane display window displayed on a display device (e.g., display 211 in FIG. 2). The graphical user interface 300 includes a display of a building graphic 302 and a plurality of associated panes or windows 304-308. In this example, the building graphic 302 is a graphical representation of a floor layout of a building and is displayed in window 306. A graphic properties editor 324 is displayed in window 308 that enables a user to edit property fields for the building graphic 302, which is advantageous for tailoring the building graphic 302 to be consistent in representing the actual building floor layout. The plurality of associated panes or windows 304-308 includes one or more fields for defining a coverage area graphic associated with one or more monitoring devices in the management system in relation to the building graphic 302 displayed in a first or primary pane or window 306 and for associating one or more devices (or corresponding data object) having a data point to be monitored by the data processing system 200.

In the illustrative example shown in FIG. 3, a hierarchical structure 322 of data objects identifiers 310-320 referencing data objects 250A-250N corresponding to devices 116, 118 and 120 within the management system 100 is displayed in the pane or window 304 (also referenced as the "system browser" pane or window) of the graphical user interface 300. For brevity in the discussion, data object identifiers 310-320 are also referenced as objects 310-320 to designate the reference to the corresponding device data objects 250A-250N stored in database 124 and/or memory 208. In the embodiment shown in FIG. 3, the object 310 corresponds to a "camera 1" that may be installed in a building represented by the building graphic 302 as a device 116, 118 or 120 managed by the management system 100. The object 310 may include a property that identifies the corresponding "camera 1" as a monitoring device, recognized by the system manager application 228. Each of the objects 312-320 correspond to a respective "controller" that may be installed in a building represented by the building graphic 302 as a device 116, 118 or 120 that interfaces with other devices 116, 118 or 120 managed by the management system 100. As described in further detail herein, objects 310-320 may be selected by a user via the graphical user interface 300 to cause the data processing system 200 and the system manager application 228 to generate and display symbols representative of the devices 116, 118 or 120 and corresponding objects 310-320 in association with a space or room represented by the building graphic 302. In so doing, the user is able to associate selected objects 310-320 corresponding to devices 116, 118 or 130 installed or to be installed in the space or room represented by the building graphic with a monitoring device also installed or to be installed in the space or room based on the location of the symbol representing selected object 310-320 and a coverage area associated with the monitoring device.

The illustration of the graphical user interface 300 in FIG. 3 is intended as an illustrative example of one embodiment of the present disclosure and not meant to imply physical or architectural limitations to the manner in which different illustrative embodiments may be implemented. For example, any number of windows may be present in the graphical user interface 300. In other examples, any number of symbols may be present in the building graphic 302 based on corresponding object identifiers (e.g., 310-320 and 702-708) as discussed in reference to the disclosed embodiments herein.

Figure 4:
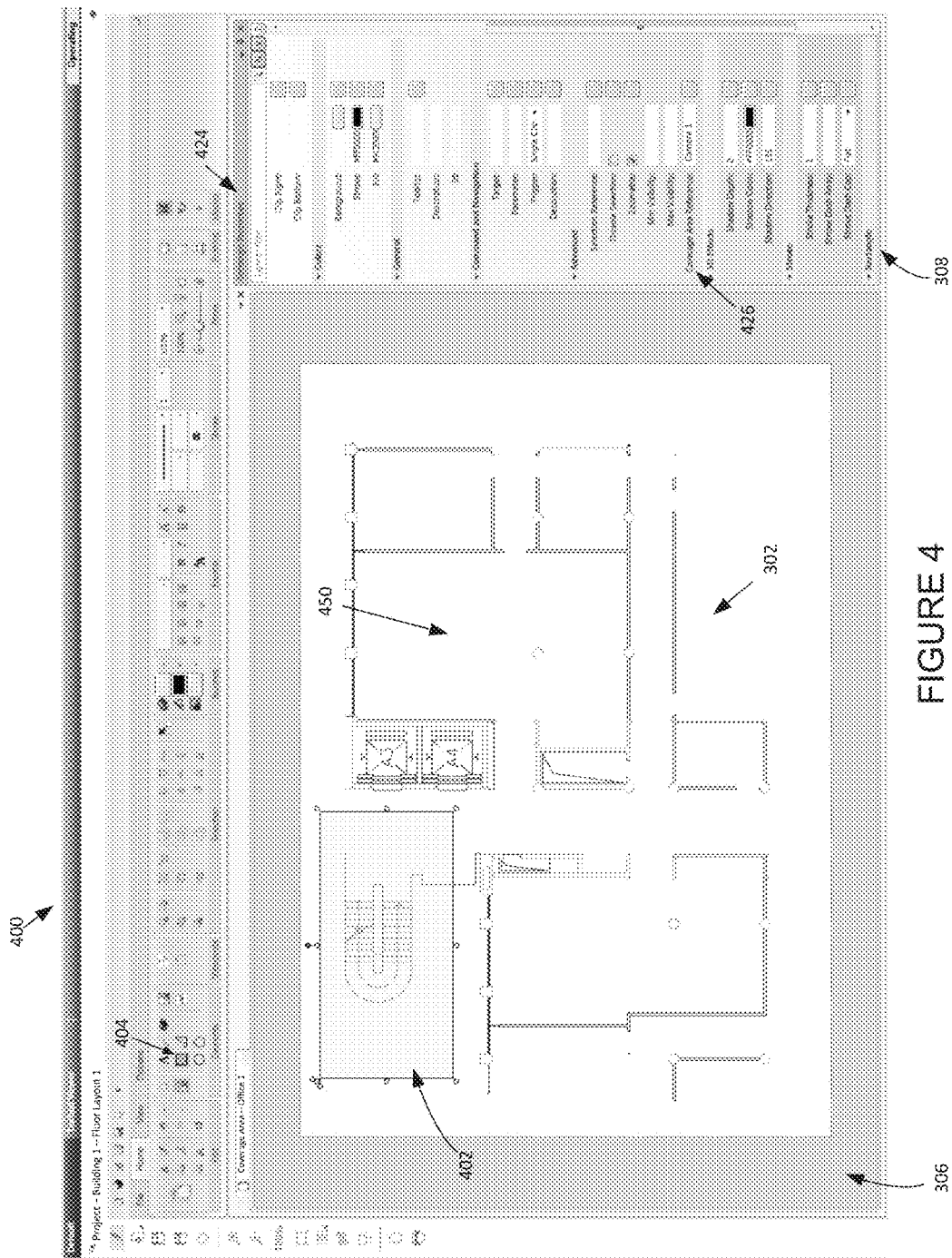
FIG. 4 illustrates an exemplary screen capture of the graphical user interface displaying a graphical representation of a coverage area generated using the system manager application in accordance with disclosed embodiments.

Turning to FIG. 4, an exemplary screen capture of the graphical user interface 400 is shown displaying a graphical representation (or coverage area graphic 402) of a coverage area generated using the system manager application 228 in accordance with disclosed embodiments. In this illustrative embodiment, the graphical user interface 400 is an example of the graphical user interface 300 in an editor mode. In the embodiment shown in FIG. 4, the processor 202 under the control of the system manager application 228 receives a request to generate the coverage area graphic 402 to be associated with one or more monitoring devices via the graphical user interface 300 upon a user selection of the graphic element icon 404. Other known input techniques (such as a respective text entry command) can be used to enter a request to generate a coverage area graphic 402. The coverage area graphic 402 may be initially generated using the system manager application 228 based on default dimensions associated with the graphic element icon 404 and displayed at a default location on the building graphic 302. A graphic properties editor 424 is displayed in window 308 that enables a user to edit property fields for the coverage area graphic 402. The properties of the coverage area graphic 402 include a "coverage area reference" 426, which references the monitoring device to be associated with the coverage area graphic 402 as further described below.

Figure 5:
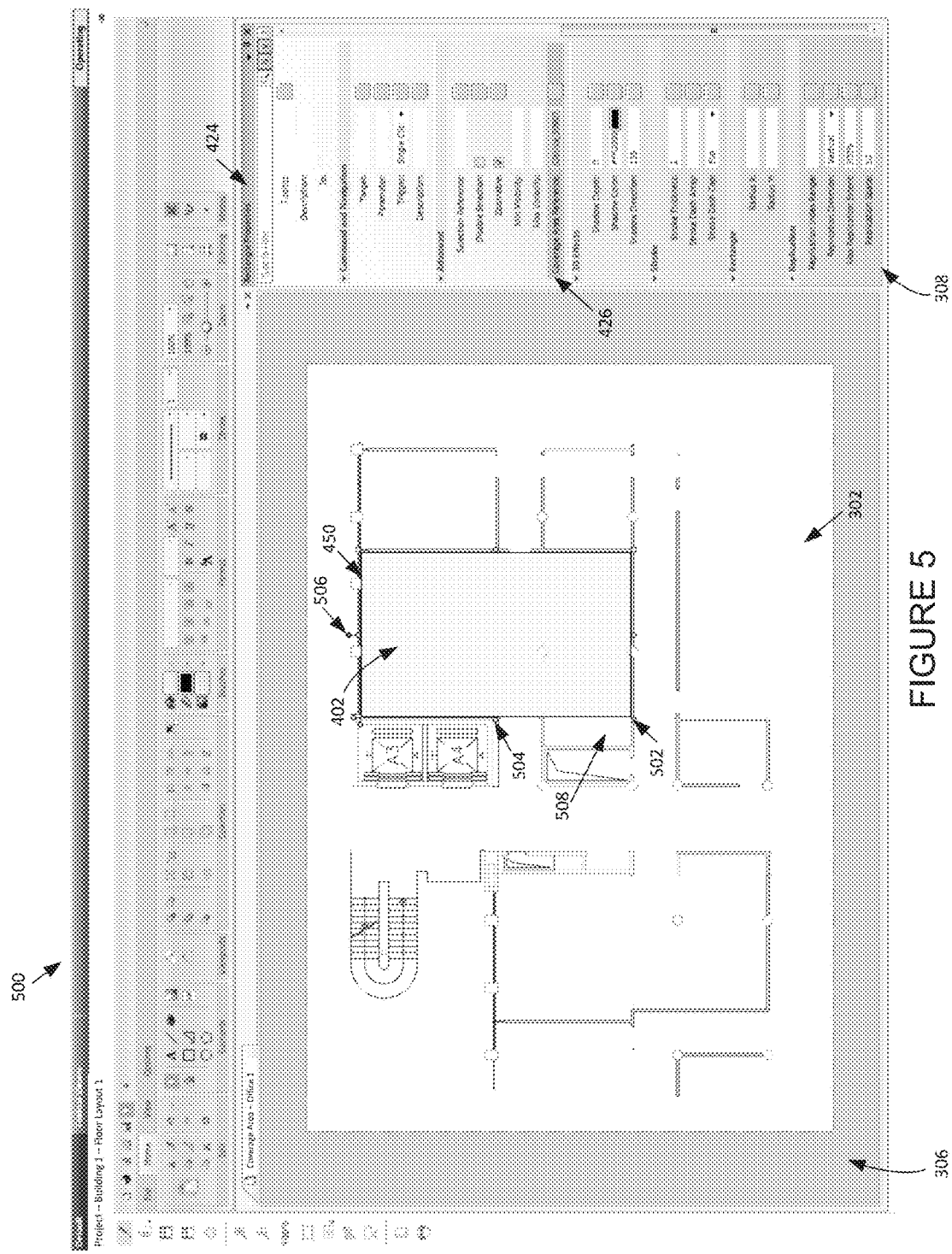
FIG. 5 illustrates an exemplary screen capture of the graphical user interface for selectively associating the coverage area graphic in FIG. 4 with a pre-defined space in a building using the system manager application in accordance with disclosed embodiments.

The reference arrow 450 points to an exemplary space or room of the building graphic 302 that a user may use the graphical user interface 400 and the system manager application 228 to associate the coverage area graphic 402 with the space or room 450 in accordance with the disclosed embodiments. For example, FIG. 5 illustrates an exemplary screen capture of the graphical user interface for selectively associating the coverage area graphic in FIG. 4 with a pre-defined space in a building using the system manager application in accordance with disclosed embodiments. In this illustrative embodiment, the graphical user interface 500 in FIG. 5 is an example of the graphical user interface 300 still in an editor mode and consistent with the graphical user interface 400 in FIG. 4. As shown in FIG. 5, the coverage area graphic 402 is oriented to fit within the space or room 450 of the building graphic 302. In one embodiment, the data processing system 200 and the system manager application 228 receive a user input via the graphical user interface 500 in the form of selection of the coverage area graphic 402 and a separate selection of the space or room 450 of the building graphic 302 to prompt the system manager application 228 to move, orient and fit the coverage area graphic 402 within the dimensions of the selected space or room 450. For example, a user may use a cursor of a mouse (or other pointing device) to select the coverage area graphic 402, drag the coverage area graphic 402 over the space or room 450 and release the mouse to signal to the data processing system 200 and the system manager application 228 via the graphic user interface 500 to move, orient and fit the coverage area graphic 402 to the dimensions of the space or room 450. In one embodiment, the dimensions of the space or room may be stored as properties of the building graphic 302 or provided in a related configuration file (not shown in the figures) associated with the building floor layout represented by the building graphic 302 that is stored in database 124 or memory 208 for access by the system manager application 228. In another embodiment, a user may use a mouse or other pointing device to select and drag graphic manipulation points 502, 504 or 506 to modify or adjust the corresponding dimensions of the coverage area graphic 402 relative to the dimensions of the space or room 450 of the building graphic 302. As shown in FIG. 5, the user may opt to use the manipulation points 502, 504 and 506 of the coverage area graphic 402 to cause the system manager application 228 to modify the coverage area graphic 402 to have an area that is less than the area defined by the dimensions of the space or room 450 of the building graphic 302 as reflected by the portion 508 of the space or room 450 that is not covered by the coverage area graphic 402 in FIG. 5. As discussed in further detail below, any building device object 310-320 that is located within the portion 510 and not within the coverage area graphic 402 may not be recognized by the system manager application 228 as being associated with the one or more monitoring devices that are assigned or associated with the coverage area graphic 402 in accordance with the disclosed embodiments herein. The data processing system 200 and system manager application 228 only automatically assign or associate related items of monitoring devices associated with the coverage area graphic 402 to building device object 210-320 that are recognized by the system manager application 228 as being within the coverage area graphic 402 as defined in accordance with the disclosed embodiments.

Figure 6:
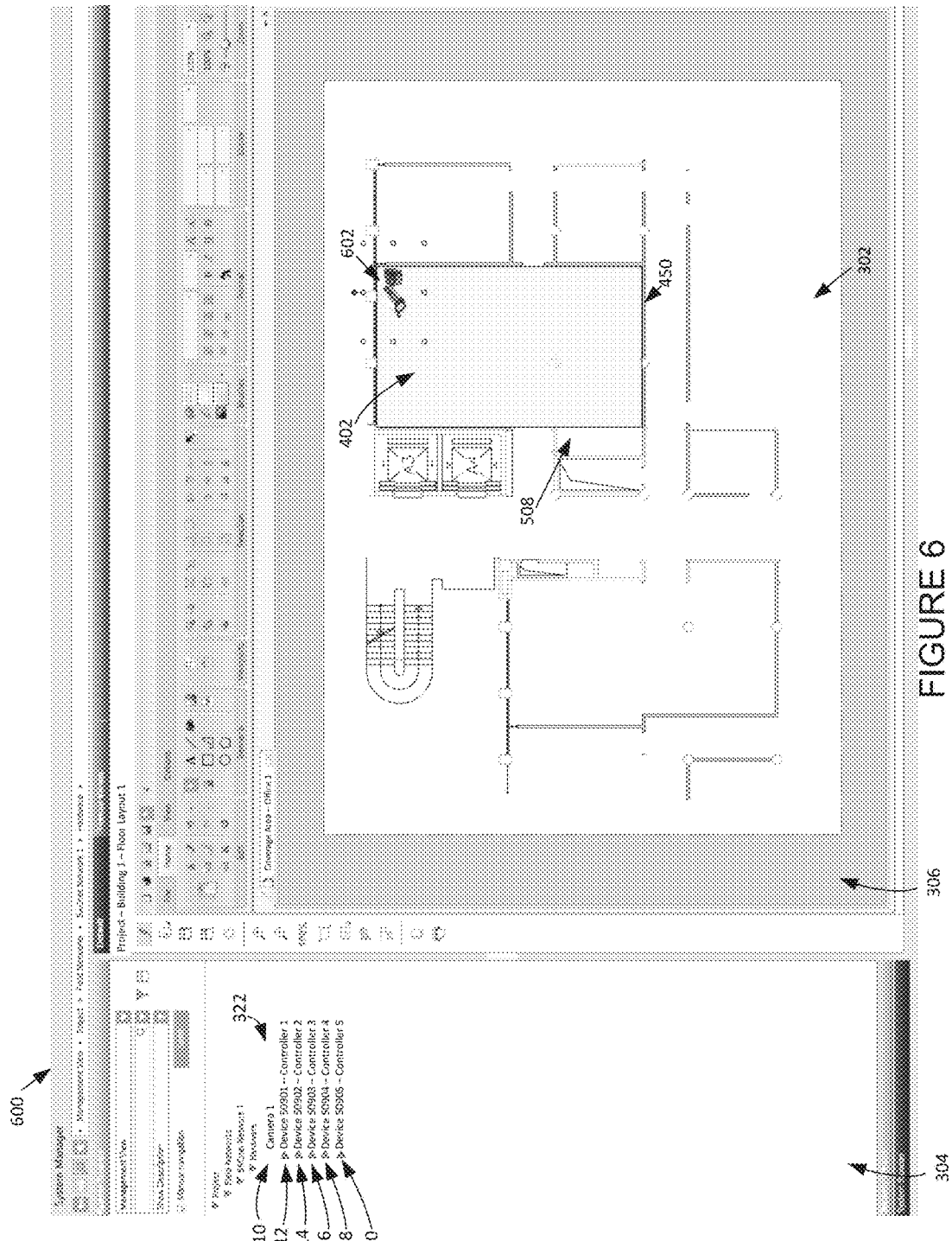
FIG. 6 illustrates an exemplary screen capture of the graphical user interface for selectively associating a monitoring device with the coverage area graphic in FIG. 4 in relation to the pre-defined space in the building using the system manager application in accordance with disclosed embodiments.

Continuing with the example embodiment depicted in FIG. 5, once the coverage area graphic 402 has been defined relative to a space or room of the building graphic 302, a user may use the graphic user interface to assign or associate one or more monitoring devices to the building graphic 302 consistent with the location of the monitoring device within the building represented by the building graphic 302. For example, FIG. 6 illustrates an exemplary screen capture of the graphical user interface for selectively associating a monitoring device with the coverage area graphic 402 in relation to the pre-defined space or room 450 in the building using the system manager application 228 in accordance with disclosed embodiments. In this illustrative embodiment, the graphical user interface 600 in FIG. 6 is an example of the graphical user interface 300 still in an editor mode and consistent with the graphical user interface 500 in FIG. 5, where the coverage area graphic 402 has been defined relative to the space or room 450 of the building graphic 302 and a monitoring device represented by a symbol 602 has been placed within the coverage area graphic 402. In the example shown in FIG. 6, the data processing system 200 and system manager application 228 may receive a user input or request to associate or assign a monitoring device and/or its respective symbol (e.g., the camera symbol 602) to the coverage area graphic 402 by using a mouse (or other pointing device) to select the corresponding object identifier (e.g., object identifier 310 corresponding to "camera 1") in the system browser pane or window 304 of the graphic user interface 600 and then drag and drop the selected object identifier within the coverage area graphic 402 associated with the previously selected space or room 450. Monitoring devices (and respective symbols) that may be associated with or assigned to the coverage area graphic 402 include any building device 116, 118, or 120 that has an associated coverage zone, such as a camera, a smoke detector, a temperature sensor, a carbon monoxide sensor, a humidity sensor, or any other environmental condition sensor or image sensor that has an operational range corresponding to a coverage zone.

As used herein, a symbol or graphics symbol (e.g., symbol 602 in FIG. 6) is a reusable graphic image that may represent, for example, a piece of equipment or device that is installed or to be installed in a building and associated with the building graphic 302. Symbols are stored in a library (e.g., in database 124) and may be used to display values for building device objects representing building devices 116, 118, and 120 in or managed by the management system 100. Symbols may be associated with one or more object types and be bound to object-type properties to create substitutions to provide a dynamic, visual representation of changing values of the corresponding devices 116, 118, and 120 in the management system 100. For example, upon placement of a symbol corresponding to an object identifier 310-320 onto a building graphic 302, the data processing system 200 under the control of the system manager application 228 may identify and display corresponding system object values in a graphics viewer of the graphics user interface 300 (or other user interfaces disclosed herein) during a runtime mode.

Placement of a symbol onto a graphic creates an "instance" or a copy of all the elements and substitution properties associated with the symbol onto the graphic. When a graphic that has a symbol associated with it is saved, the data processing system 200 may only store the referenced symbol and the associated properties for that symbol. As a result, modifications to the properties of the symbol placed in the graphic only affect the instance of the symbol included in the graphic.

The building device object (e.g., 250A in FIG. 2) identified by an object identifier (e.g., 310 for "camera 1" in FIG. 6) may include a "coverage zone" property that identifies to the data processing system 200 and system manager application 228 that the building device object (e.g., 250A) is associated with a monitoring device. The "coverage zone" identifies a corresponding coverage range and volume associated with the monitoring device to the data processing system 200 and system manager application 228. The "coverage zone" of the monitoring device may be used by the data processing system 200 and system manager application 228 to verify the size and dimensions of a coverage area graphic 402 to which the applicable monitoring device is selectively associated by the user the coverage area graphic 402 as further described herein.

Similarly, each building device object (e.g., 250A in FIG. 2) identified by an object identifier (e.g., 310 for "camera 1" in FIG. 6) may include a "building location" property that identifies to the data processing system 200 and system manager application 228 that the location of the applicable building device relative to the space or room of the building where the applicable building device is or will be installed. The "building location" property of the building device object (e.g., 250A in FIG. 2) may be used by the data processing system 200 and system manager application 228 to verify the location of the symbol (e.g., 602 in FIG. 6) corresponding to the building object identifier (e.g., 310 in FIG. 6) relative to the selected space or room (e.g., 450 in FIG. 6) and relative to the coverage area graphic 402 placement in the selected space or room. In response to determining that the user selected location of a symbol (e.g., 602) within the space or room (e.g., 450) and/or within the coverage area graphic 402 is not within a pre-determined tolerance (e.g., 0 to 1 foot scaled to a dimension of the building graphic 302), the system manager application 228 may automatically move or adjust the user selected location of the symbol to be within the pre-determined tolerance and re-display the symbol at the adjusted user selected location within the space or room (e.g., 450) and relative to the coverage area graphic 402.

Figure 7:
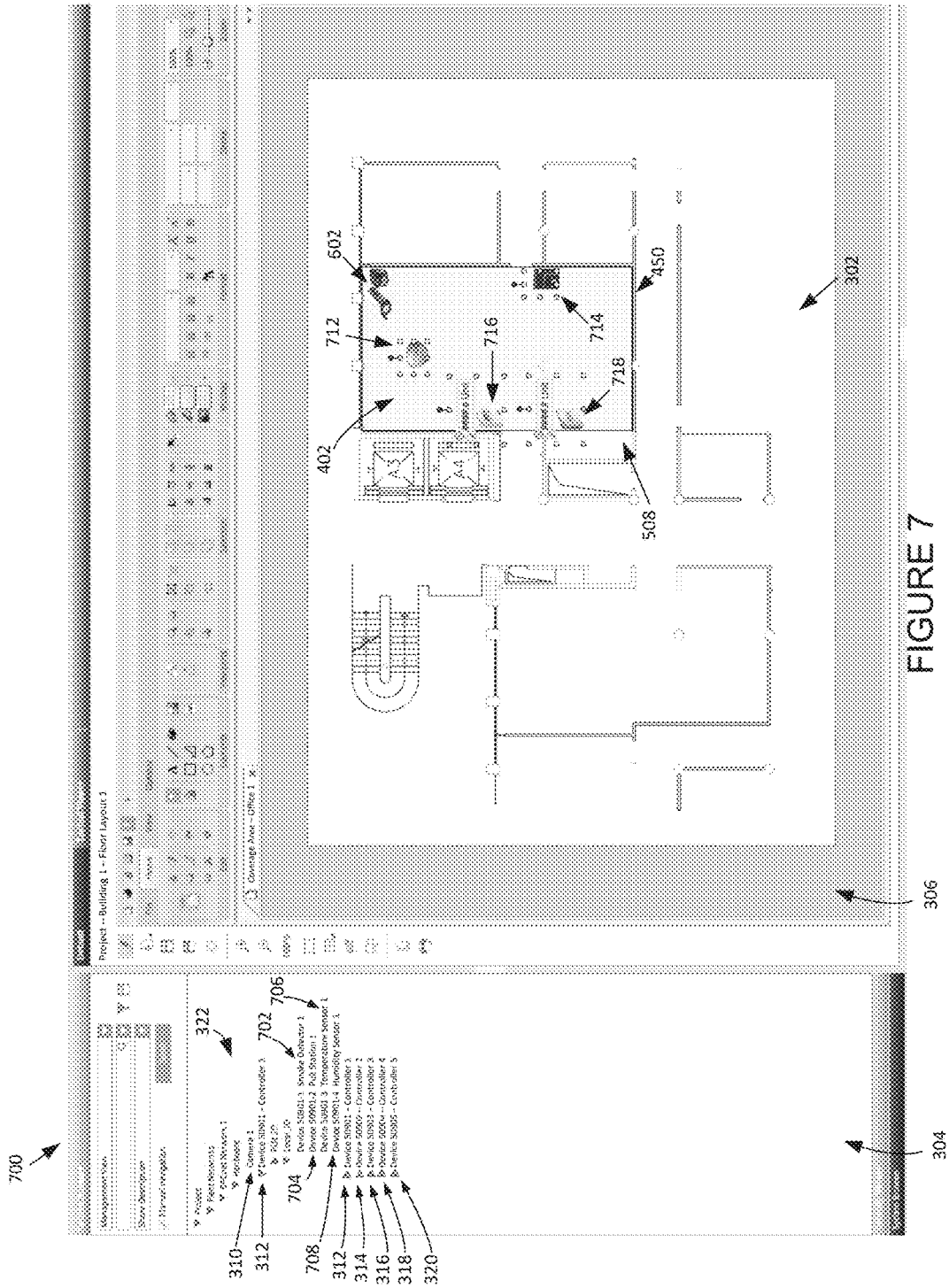
FIG. 7 illustrates an exemplary screen capture of the graphical user interface where symbols corresponding to devices within the building are selectively associated with the coverage area graphic in FIG. 4 using the system manager application in accordance with disclosed embodiments.

Turning to FIG. 7, an exemplary screen capture of the graphical user interface 700 is shown where symbols 712-718 corresponding to building devices (e.g., devices 116, 118, and 120 in FIG. 1) that are or may be installed in the building are selectively associated with the coverage area graphic 402 using the system manager application 228 in accordance with disclosed embodiments. The graphical user interface 700 in FIG. 7 is an example of the graphical user interface 300 still in an editor mode and consistent with the graphical user interface 600 in FIG. 6. In this illustrative embodiment, the data processing system 200 and system manager application 228 may receive via the graphical user interface 700 a user input or request to associate or assign a building device and/or its respective symbol to the coverage area graphic 402 by using a mouse (or other pointing device) to select the corresponding object identifier in the system browser pane or window 304 of the graphic user interface 600 and then drag and drop the selected object identifier within the coverage area graphic 402. In the example shown in FIG. 7, a user using this input technique with the graphical user interface 700 has selected each of the object identifiers 702-708 in the system browser pane 304 (corresponding to building devices 250B-250E in FIG. 2 identified as "Device 50901-1 Smoke Detector 1", "Device 50901-2 Pull Station 1", "Device 50901-3 Temperature Sensor 1", "Device 50901-4 Humidity Sensor 1") for placement with the coverage area graphic 402. In performing this input technique, the data processing system 200 and system manager application 228 receive via the graphic user interface 700 the identification of each device corresponding to the object identifiers 702-708, and the user selected location of the respective identified device relative to the coverage area corresponding to the coverage area graphic 402. In response, the data processing system 200 and system manager application 228 generate (or retrieve from the symbol library in database 124) the symbols 712-718 representing each identified device (i.e., corresponding to the object identifiers 702-708) and displays via the graphic user interface 700 each symbol 712-718 at the user selected location relative to the coverage area graphic 402.

As previously disclosed, each building device object identified by an object identifier (e.g., 702-718 for "Smoke Detector 1", "Pull Station 1", "Temperature Sensor 1", "Humidity Sensor 1" in FIG. 7) may include a "building location" property that identifies to the data processing system 200 and system manager application 228 that the location of the applicable building device relative to the space or room of the building where the applicable building device is or will be installed. The "building location" property of the building device object may be used by the data processing system 200 and system manager application 228 to verify the location of the respective symbol (e.g., 712-718) corresponding to the building object identifier (e.g., 702-708) relative to the selected space or room (e.g., 450 in FIG. 7) and relative to the coverage area graphic 402 placement in the selected space or room. In response to determining that the user selected location of the respective symbol (e.g., 712-718) within the space or room (e.g., 450) and/or within the coverage area graphic 402 is not within a pre-determined tolerance (e.g., 0 to 1 foot scaled to a dimension of the building graphic 302), the system manager application 228 may automatically move or adjust the user selected location of the symbol to be within the pre-determined tolerance and re-display the symbol at the adjusted user selected location within the space or room (e.g., 450) and relative to the coverage area graphic 402.

For each symbol 712-718 that the data processing system 200 and the system manager application 228 determine is within the coverage area graphic 402 (and correspondingly confirms that each building device represented by the symbol 712-718 is within the coverage area represented by the coverage area graphic 402), the data processing system 200 and the system manager application 228 automatically (1) retrieve each related item identifier associated with each monitoring device associated with the coverage area graphic 402 (as reflected by the placement of a corresponding monitoring device symbol 602 on the coverage area graphic 402), and (2) stores each related item identifier of each monitoring device associated with the coverage area graphic 402 as a property of each building device object (e.g., 250A-250E) corresponding to the symbols verified to be within the coverage area graphic 402.

As described in detail herein, a "related item" may be a link to information about or related to the building device that is represented by or corresponds to the applicable building device object (e.g., 250A-250N) and identified by the respective object identifiers (e.g., 310-320 and 702-708). For example, the related items may include floor plan graphics for areas close to or involving the selected building device object, maintenance reports relating to that area, schedules, reports, or the like that may reference the respective building device object. Related items associated with a monitoring device may include a reference or link to live monitored information from the monitoring device. For example, a related item identifier associated with a camera device object identified as a monitoring device may be a video image associated with the corresponding camera device located in the space or room 450 and represented by the camera device symbol 602 within the coverage area graphic 402. Alternatively, a related item identifier associated with a smoke detector device object identified as a monitoring device may be a current smoke alarm status or a detected level of smoke within the coverage zone associated with the smoke detector device (if smoke detection level is an output provided by the respective smoke detector to the data processing system 200).

By enabling a user (such as a facility administrator) to define a coverage area graphic 402, associate the coverage area graphic 402 with a monitoring device symbol 602, and associate other building device symbols 712-718 with the coverage area graphic 402 in accordance with the disclosed embodiments, the user is advantageously able to have related items associated with the monitoring device represented by the device symbol in the coverage area graphic be automatically assigned to the other building device symbols within the same coverage area graphic such that the user may easily select a building device symbol and be presented with corresponding related item identifiers in order to selectively view the related items as further described herein.

Figure 8:
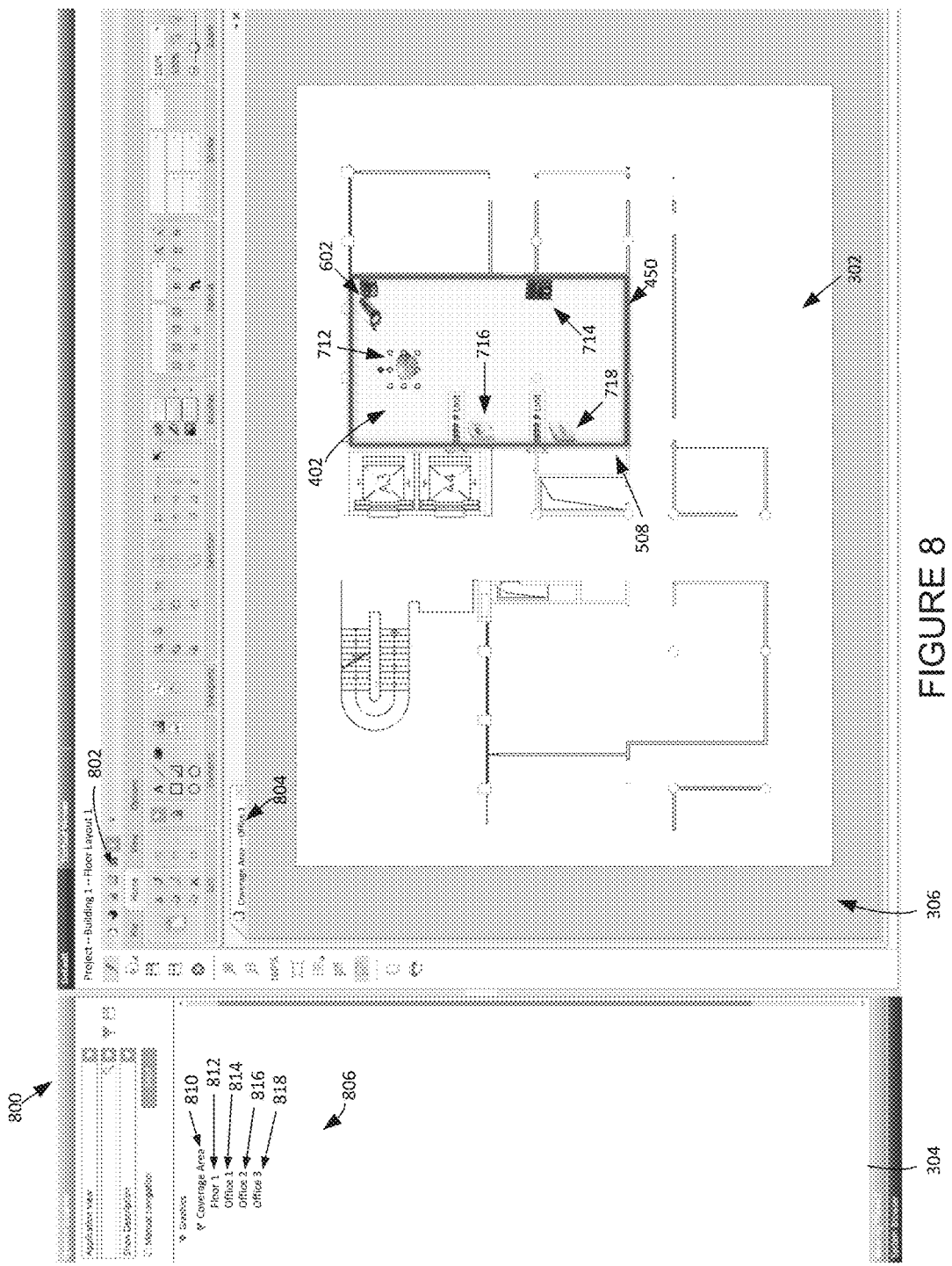
FIG. 8 illustrates an exemplary screen capture of the graphical user interface for selectively identifying the coverage area graphic in FIG. 4 in relation to symbols associated with devices within the building for further processing using the system manager application in accordance with disclosed embodiments.

Turning to FIG. 8, a user may prompt the data processing system 200 and the system manager application 208 via a save icon 802 of the graphical user interface 800 (which is another example of the graphical user interface 300) to save and store the coverage area graphic 402 in association with the building graphic 302 for access when returning to the editor mode or during a runtime mode. The data processing system 200 and the system manager application 208 may also prompt the user via the graphic user interface 800 for a name for the coverage area graphic 402 (e.g., "Office 1" in FIG. 8), which may be subsequently displayed as an identification 804 in association with the coverage area graphic 402 and the associated building graphic 302. Coverage area graphics and building graphics may be stored in a hierarchical structure library (e.g., in database 124). In the example shown in FIG. 8, a hierarchical structure 806 of graphic object identifiers 810-818 stored in the database 124 may be retrieved and displayed in the system browser pane or window 304 (also referenced as the "system browser" pane or window) for selective access by the user. In this illustrative example, the graphic object identifier 810 identifies the "coverage area" graphics within the hierarchical structure 806 of graphic object identifiers stored in the database 124. The graphic object identifier 812 corresponds to the building graphic 302 (e.g., identified as "Floor 1") and the graphic object identifiers 814-818 identify the respective coverage area graphics that have been defined in association with the building graphic 302 in accordance with the disclosed embodiments. For example, the graphic object identifier 814 corresponds to the coverage area graphic 402 (e.g., identified as "Office 1"). The other graphic object identifiers 816 and 818 each correspond to a respective coverage area graphic defined in accordance with the disclosed embodiments.

Figure 9:
FIG. 9 illustrates an exemplary screen capture of the graphical user interface for selectively identifying one of the device symbols associated with the coverage area graphic in FIG. 4 and displaying identifiers of related items associated with the device corresponding to the identified device symbol using the system manager application in accordance with disclosed embodiments.

After a coverage area graphic (e.g., 402) is defined relative to a building graphic (e.g., 302) and each related item identifier of each monitoring device (e.g., as represented by a corresponding symbol 602) associated with the coverage area graphic is stored as a property of each building device object (e.g., 250A-250E) having a corresponding building device symbol within the coverage area graphic, a user using the graphical user interface as shown in FIG. 9 may selectively identify one of the building device symbols and cause the data processing system and system manager application to display (via the graphical user interface) the related item identifiers associated with the device corresponding to the identified device symbol. The graphical user interface 900 depicted in FIG. 9 is an example of the graphical user interface 300 in a runtime mode. In this illustrative embodiment, the graphical user interface 900 comprises a multi-area or multi-pane display window displayed on a display device (e.g., display 211 in FIG. 2). The graphical user interface 900 includes a display of the user selected building graphic 302 displayed in the primary window 306 with the monitoring device symbol 602 and building device symbols 712-718 displayed relative to the space or room 450 consistent with the respective location of each of such symbols within the coverage area graphic 402 as defined by the user in accordance with the disclosed embodiments. In FIG. 9, the user has not prompted the system manager application via the graphic user interface 900 to display the coverage area graphic 402 (as reflected by the dashed reference arrow for 402). In one embodiment, the user may use a mouse or other pointer device to select anywhere in the space or room 450 to cause the corresponding coverage area graphic 402 to be displayed by the system manager application relative to the space or room 400 as previously defined.

When the user selects one of the building device symbols 716-718 associated with the coverage area graphic 402, the data processing system 200 and system manager application 228 display properties of the corresponding building device object (e.g., identified by the respective object identifier 702-708 in FIG. 7) in a second pane or window 902, and display related item identifiers associated with the building device object in a third pane or window 904. For example, as shown in FIG. 9, the temperature sensor device symbol 716 is selected causing the data processing system 200 and system manager application 228 to: (1) display the properties of the corresponding building device object (identified by the "temperature sensor 1" object identifier 706 in FIG. 7) in the second pane 902, and (2) display the related item identifiers associated with the corresponding temperature sensor 1 device object in accordance with the related item category of monitoring devices 912 as well as other related item categories such as graphics 916, notification element 918, operating procedure 920, report 922 and trends 924. Continuing with the example shown in FIG. 9, in pane 902, the "Present Value" identifier 906 is displayed in association with the corresponding value 910 (e.g., present value of 35.00° F.) for the temperature sensor device object associated with the selected temperature sensor device symbol 716 in pane 306. In pane 904, the related item identifier 914 (e.g., "camera 1") is displayed below the related item monitoring device category 912. The related item identifier 914 (e.g., "camera 1") corresponds to the identification of the monitoring device and object (represented by its symbol 602) that was previously associated with the coverage area graphic 402 in accordance with the disclosed embodiments. Other related item identifier categories (e.g., graphics 916, notification element 918, operating procedure 920, report 922 and trend 924) are also displayed to indicate other related items that are associated with the device object corresponding to the selected device symbol (e.g., temperature sensor device symbol 716) in pane 306.

Figure 10:
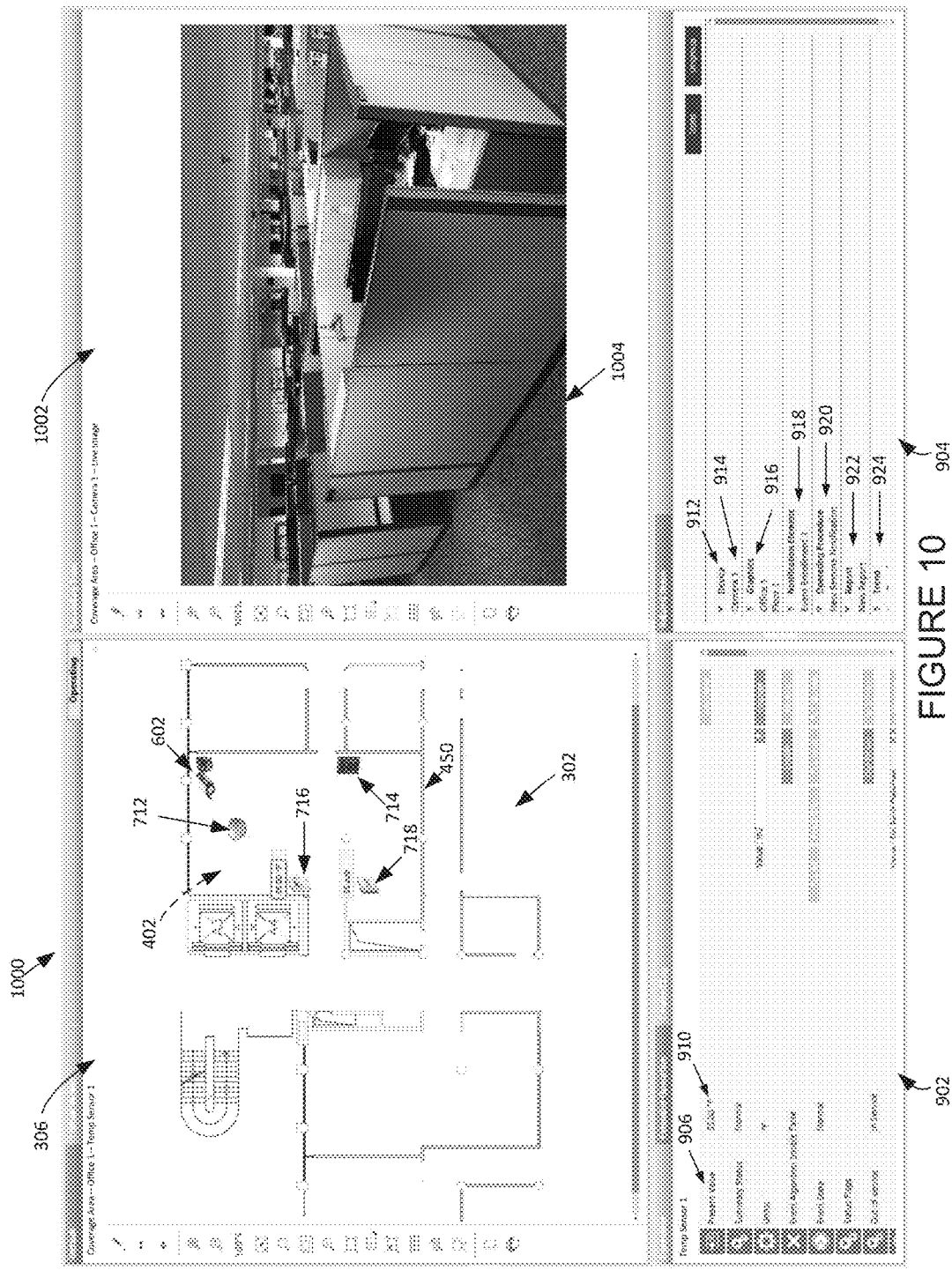
FIG. 10 illustrates an exemplary screen capture of the graphical user interface for selecting one of the related item identifiers displayed in FIG. 9 and displaying the related item corresponding to the selected related item using the system manager application in accordance with disclosed embodiments.

Upon selecting a related item identifier (e.g., 914 for "camera 1") corresponding to the monitoring device and object (represented by its symbol 602), the data processing system 200 and system manager application 228 generate and display the corresponding related item 1004 in a fourth pane or window 1002 of the graphical user interface 1000 as depicted in FIG. 10 (where the graphical user interface 1000 is another example of the graphical user interface 300 that is consistent with the graphical user interface 900). In this illustrative example, the related item 1004 is a live camera image received by the data processing system 200 and the system manager application 228 from the "camera 1" monitoring device object (e.g., 250A in FIG. 2) having the related item identifier 914 and that was previously associated with the coverage area graphic 402 in accordance with the disclosed embodiments. Thus, the disclosed embodiments, enable a related item of a monitoring device (e.g., such as represented by "camera 1" 602) to be quickly and conveniently associated with other building devices that are selectively associated with the same coverage area graphic representing the coverage zone of the applicable monitoring device.

Figure 11:
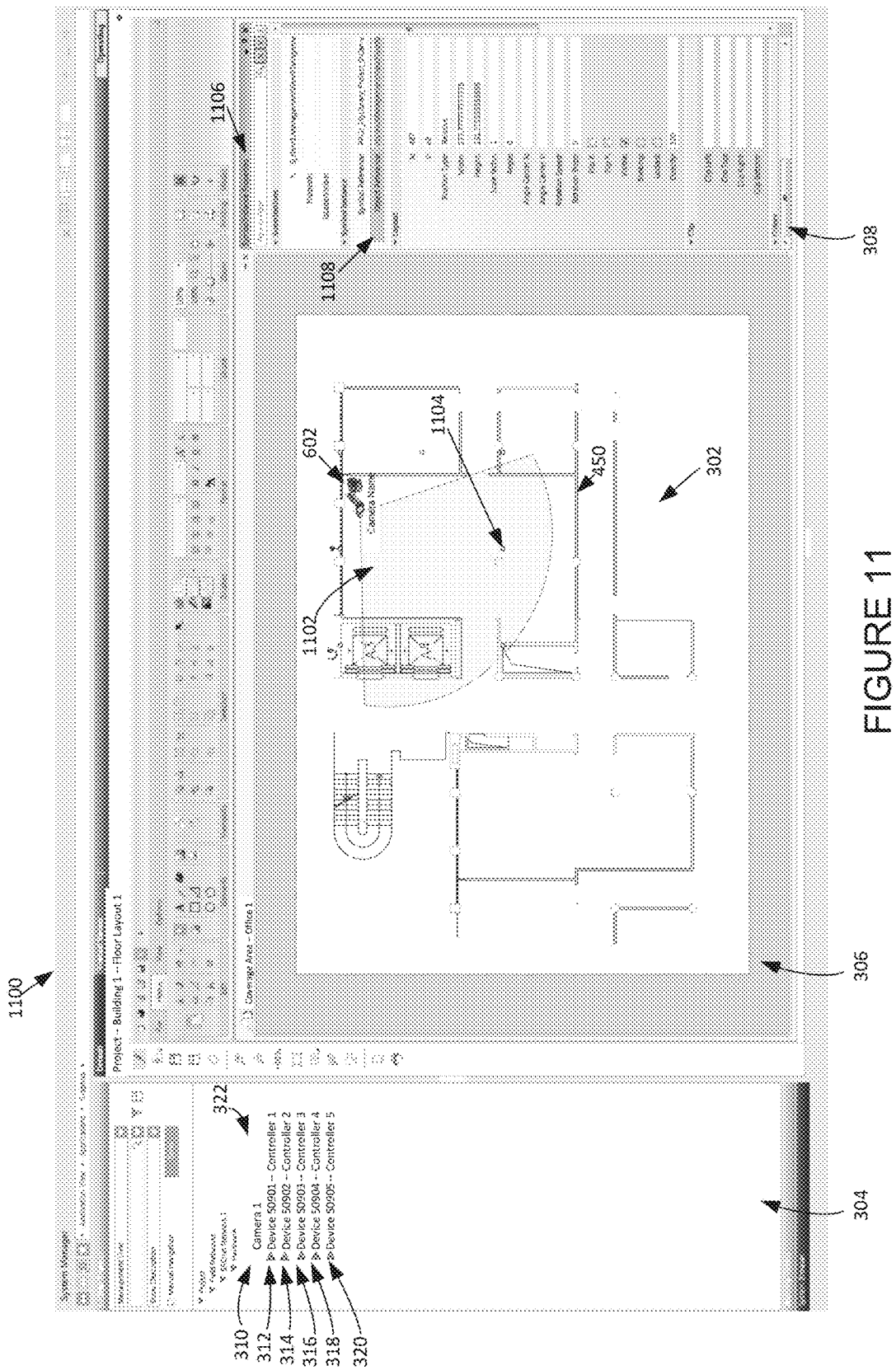
FIG. 11 illustrates an exemplary screen capture of another embodiment of the graphical user interface for selectively associating a monitoring device having a pre-defined coverage zone in relation to the pre-defined space in the building using the system manager application in accordance with disclosed embodiments.

FIG. 11 illustrates an exemplary screen capture of another embodiment of the graphical user interface for selectively associating a monitoring device having a pre-defined coverage zone in relation to the pre-defined space in the building using the system manager application in accordance with disclosed embodiments. In this illustrative embodiment, the graphical user interface 1100 is another example of the graphical interface 300 generated by the data processing system 200 and the system manager application 228. In the example shown in FIG. 11, the graphical user interface 1100 is in an editor mode. The graphical user interface 1100 includes a display of a building graphic 302 in window 306 that depicts a graphical representation of a floor layout of a building. A hierarchical structure 322 of data objects identifiers 310-320 referencing data objects 250A-250N corresponding to devices 116, 118 and 120 within the management system 100 is again displayed in the system browser pane or window 304 of the graphical user interface 1100.

In the embodiment shown in FIG. 11, the object 310 corresponds to a "camera 1" that may be installed in a building represented by the building graphic 302 as a device 116, 118 or 120 managed by the management system 100. The object 310 may include a property that identifies the corresponding "camera 1" as a monitoring device, recognized by the system manager application 228. In this embodiment, the processor 202 under the control of the system manager application 228 receives a request to generate a coverage area graphic to be associated with one or more monitoring devices via the graphical user interface 1100 upon a user selection of the monitoring device object identifier (e.g., 310 for "camera 1") and a separate selection of the space or room 450 of the building graphic 302. In the example shown in FIG. 1100, the user may select the "camera 1" monitoring device object identifier 310 using a mouse or other pointing device and drag and drop the selected identifier 310 to a location within the space or room 450. In response, the system manager application 228 recognizes the request to generate a coverage area graphic and displays a symbol (e.g., 602) corresponding to the selected monitoring device over the building graphic 302 based on the location received from the user. As described herein, the system manager application 228 may identify the object identifier (e.g., 310 for "camera 1" in FIG. 6) as a monitoring device based on the corresponding object having a "coverage zone" property. The "coverage zone" identifies a corresponding coverage range and volume associated with the monitoring device to the data processing system 200 and system manager application 228. In the embodiment shown in FIG. 1100, in conjunction with displaying the symbol (e.g., 602) of the selected monitoring device object, the system manager application displays a coverage zone graphic 1102 corresponding to the coverage range and volume identified by the "coverage zone" property of the monitoring device object.

When the coverage zone graphic does exceeds a dimension of the selected space or room 450, the data processing system 200 and the system manager application 228 may prompt the user whether the coverage zone graphic 1102 should be modified or limited to fit within the selected space or room 450. The prompt may be conveyed to the user by flashing the coverage zone graphic 1102 on and off, providing a dialog box to receive a yes or no input from the user, or any other known input technique.

The data processing system 200 and system manager application 228 may verify that the coverage zone of the monitoring device and corresponding to the coverage zone graphic 1102 does not exceed the size and dimensions of the selected space or room 450. As previously described, the dimensions of the space or room 450 may be stored as properties of the building graphic 302 or provided in a related configuration file (not shown in the figures) associated with the building floor layout represented by the building graphic 302 that is stored in database 124 or memory 208 for access by the system manager application 228. In another embodiment, a user may use a mouse or other pointing device to select and drag graphic manipulation points (e.g., 1104 and other points not in view in FIG. 1100) of the coverage zone graphic to modify or adjust the corresponding dimensions of the coverage zone graphic 1102 relative to the dimensions of the space or room 450 of the building graphic 302. Alternatively, the system manager application may display via the graphic user interface 1100 a properties editor 1106 in pane 308 for a user to change dimensions of the coverage zone graphic 1102 to fit within the selected space or room 450 of the building graphic 302. The properties of the coverage zone graphic 1102 may include an "object reference" property 1108 that includes an identification or link to the instance of the coverage zone graphic 1102 stored by the system manager application 228 for later access.

Figure 12:
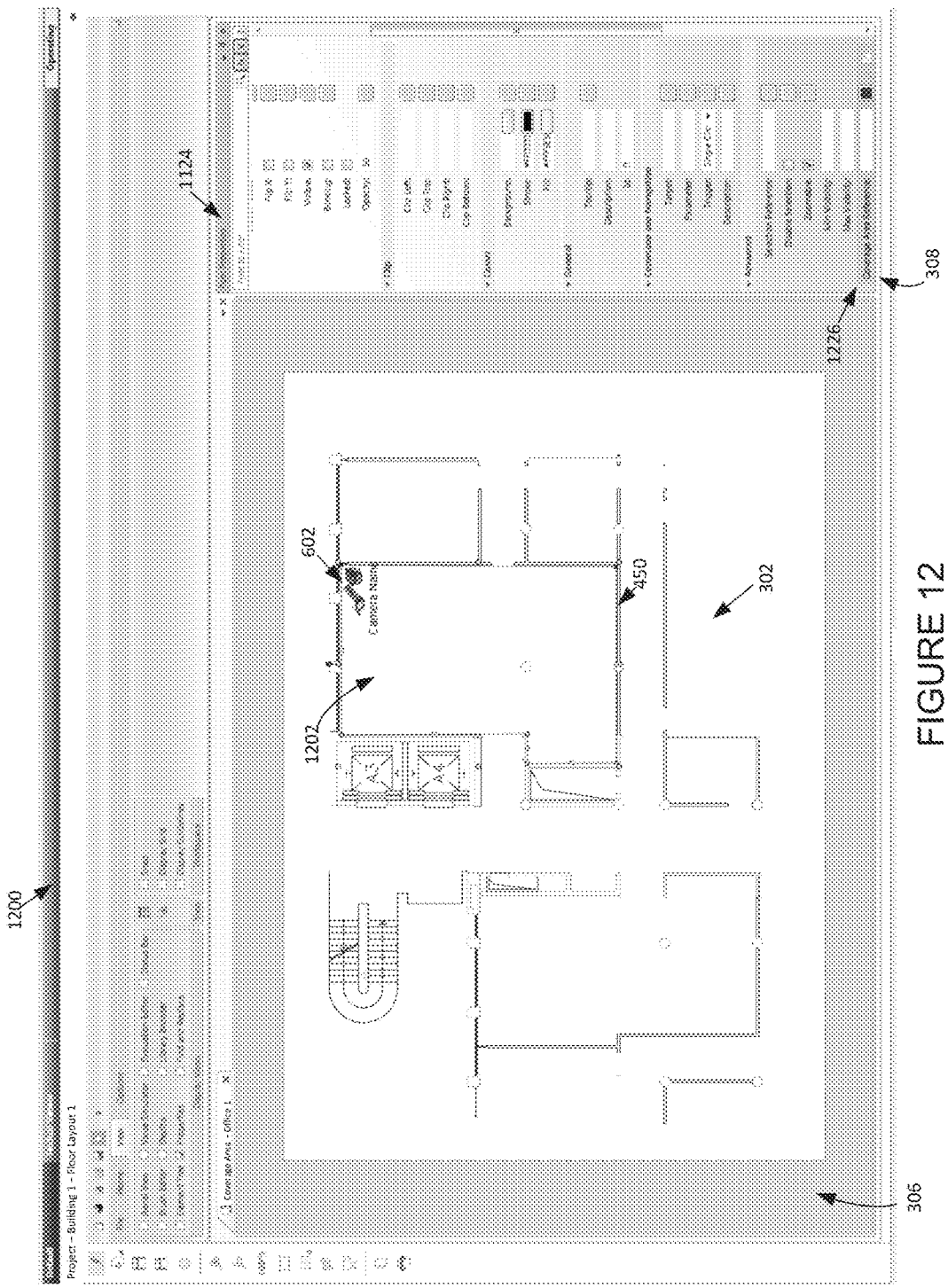
FIG. 12 illustrates an exemplary screen capture of the graphical user interface displaying a graphical representation of a coverage area generated using the system manager application based on the pre-defined coverage zone of the monitoring device and the pre-defined space in the building in accordance with disclosed embodiments.

Turning to FIG. 12, an exemplary screen capture of the graphical user interface 1200 is shown displaying a graphical representation 1202 of a coverage area (also referenced as coverage area graphic 1202) generated using the system manager application 228 based on the pre-defined coverage zone 1102 of the monitoring device corresponding to the symbol 602 associated with the selected space or room 450 in the building in accordance with disclosed embodiments. In this illustrative embodiment, the graphical user interface 1200 is another example of the graphical interface 300 in editor mode generated by the data processing system 200 and the system manager application 228 to be consistent with the graphical interface 1100 in FIG. 11. In the example shown in FIG. 12, after verifying that the coverage zone (represented by the coverage zone graphic 1102) of the monitoring device exceeds a dimension of the selected space or room 450 and after receiving a response to a user prompt to fit the coverage zone graphic 1102 to the selected space or room 450, the system manager application generates the coverage area graphic 1202 based on the coverage zone 1102 modified to fit within the selected space or room 450 of the building graphic 302. Although the coverage area graphic 1202 as shown in FIG. 12 completely fills the total area defined by the wall dimensions of the selected space or room 450, the coverage area graphic 1202 may be generated and displayed to be less than the total area of the selected space or room 450 based on the range and volume of the coverage zone stored as the "coverage zone" property of the applicable monitoring device object represented by the symbol 602 placed within the selected space or room 450 of the building graphic 302 in accordance with the disclosed embodiments.

When the coverage area graphic 1202 is displayed, the data processing system 200 and system manager application 228 may also display a graphic properties editor 1124 in window 308 of the graphic user interface 1200 to enable a user to edit property fields for the coverage area graphic 1202. The properties of the coverage area graphic 402 include a "coverage area reference" identified as 1126 in FIG. 12. The "coverage area reference" references the monitoring device to be associated with the coverage area graphic 1202.

Figure 13:
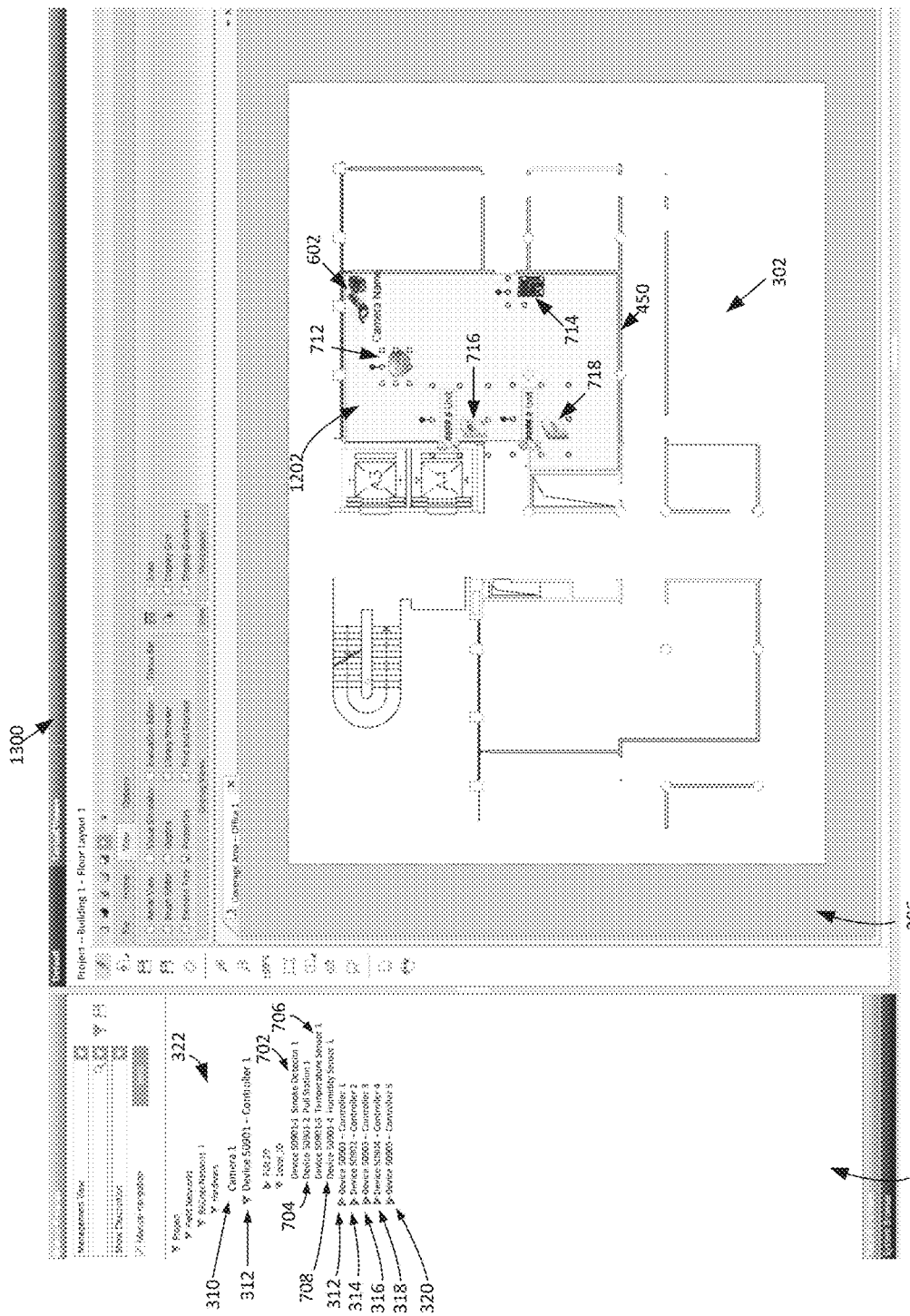
FIG. 13 illustrates an exemplary screen capture of the graphical user interface where symbols corresponding to devices within the building are selectively associated with the coverage area graphic in FIG. 12 using the system manager application in accordance with disclosed embodiments.

Similar to the embodiment described in reference to FIG. 7, FIG. 13 illustrates an exemplary screen capture of the graphical user interface 1300 where symbols 712-718 corresponding to building devices (e.g., devices 116, 118, and 120 in FIG. 1) that are or may be installed in the building are selectively associated with the coverage area graphic 1202 using the system manager application 228 in accordance with disclosed embodiments. The graphical user interface 1300 is an example of the graphical user interface 300 still in an editor mode and consistent with the graphical user interface 1200 in FIG. 12. In this illustrative embodiment, the data processing system 200 and system manager application 228 may receive via the graphical user interface 1300 a user input or request to associate or assign a building device and/or its respective symbol to the coverage area graphic 1202 by using a mouse (or other pointing device) to select the corresponding object identifier in the system browser pane or window 304 of the graphic user interface 1300 and then drag and drop the selected object identifier within the coverage area graphic 1202. In the example shown in FIG. 13, a user using this input technique with the graphical user interface 1300 has selected each of the object identifiers 702-708 in the system browser pane 304 (corresponding to building devices 250B-250E in FIG. 2 identified as "Device 50901-1 Smoke Detector 1", "Device 50901-2 Pull Station 1", "Device 50901-3 Temperature Sensor 1", "Device 50901-4 Humidity Sensor 1") for placement with the coverage area graphic 1202. In performing this input technique, the data processing system 200 and system manager application 228 receive via the graphic user interface 1300 the identification of each device corresponding to the object identifiers 702-708, and the user selected location of the respective identified device relative to the coverage area corresponding to the coverage area graphic 1202. In response, the data processing system 200 and system manager application 228 generate (or retrieve from the symbol library in database 124) the symbols 712-718 representing each identified device (i.e., corresponding to the object identifiers 702-708) and displays via the graphic user interface 700 each symbol 712-718 at the user selected location relative to the coverage area graphic 1202.

As previously disclosed, each building device object identified by an object identifier (e.g., 702-718 for "Smoke Detector 1", "Pull Station 1", "Temperature Sensor 1", "Humidity Sensor 1" in FIG. 7) may include a "building location" property that identifies to the data processing system 200 and system manager application 228 that the location of the applicable building device relative to the space or room of the building where the applicable building device is or will be installed. The "building location" property of the building device object may be used by the data processing system 200 and system manager application 228 to verify the location of the respective symbol (e.g., 712-718) corresponding to the building object identifier (e.g., 702-708) relative to the selected space or room (e.g., 450 in FIG. 7) and relative to the coverage area graphic 1202 placement in the selected space or room 450. In response to determining that the user selected location of the respective symbol (e.g., 712-718) within the space or room (e.g., 450) and/or within the coverage area graphic 402 is not within a pre-determined tolerance (e.g., 0 to 1 foot scaled to a dimension of the building graphic 302), the system manager application 228 may automatically move or adjust the user selected location of the symbol to be within the pre-determined tolerance and re-display the symbol at the adjusted user selected location within the space or room (e.g., 450) and relative to the coverage area graphic 1202.

For each symbol 712-718 that the data processing system 200 and the system manager application 228 determine is within the coverage area graphic 1202 (and correspondingly confirms that each building device represented by the symbol 712-718 is within the coverage area represented by the coverage area graphic 1202), the data processing system 200 and the system manager application 228 automatically (1) retrieve each related item identifier associated with each monitoring device associated with the coverage area graphic 1202 (as reflected by the placement of a corresponding monitoring device symbol 602 on the coverage area graphic 1202), and (2) stores each related item identifier of each monitoring device associated with the coverage area graphic 1202 as a property of each building device object (e.g., 250A-250E) corresponding to the symbols verified to be within the coverage area graphic 1202.

By enabling a user (such as a facility administrator) to define a coverage area graphic 1202 based on a coverage zone associated with a selected monitoring device (represented by its symbol 602 selectively located within a space or room 450), and to associate other building device symbols 712-718 with the coverage area graphic 402 in accordance with the disclosed embodiments, the user is advantageously able to have related items associated with the monitoring device represented by the device symbol in the coverage area graphic be automatically assigned to the other building device symbols within the same coverage area graphic such that the user may easily select a building device symbol and be presented with corresponding related item identifiers in order to selectively view the related items as described in detail herein.

Figure 14:
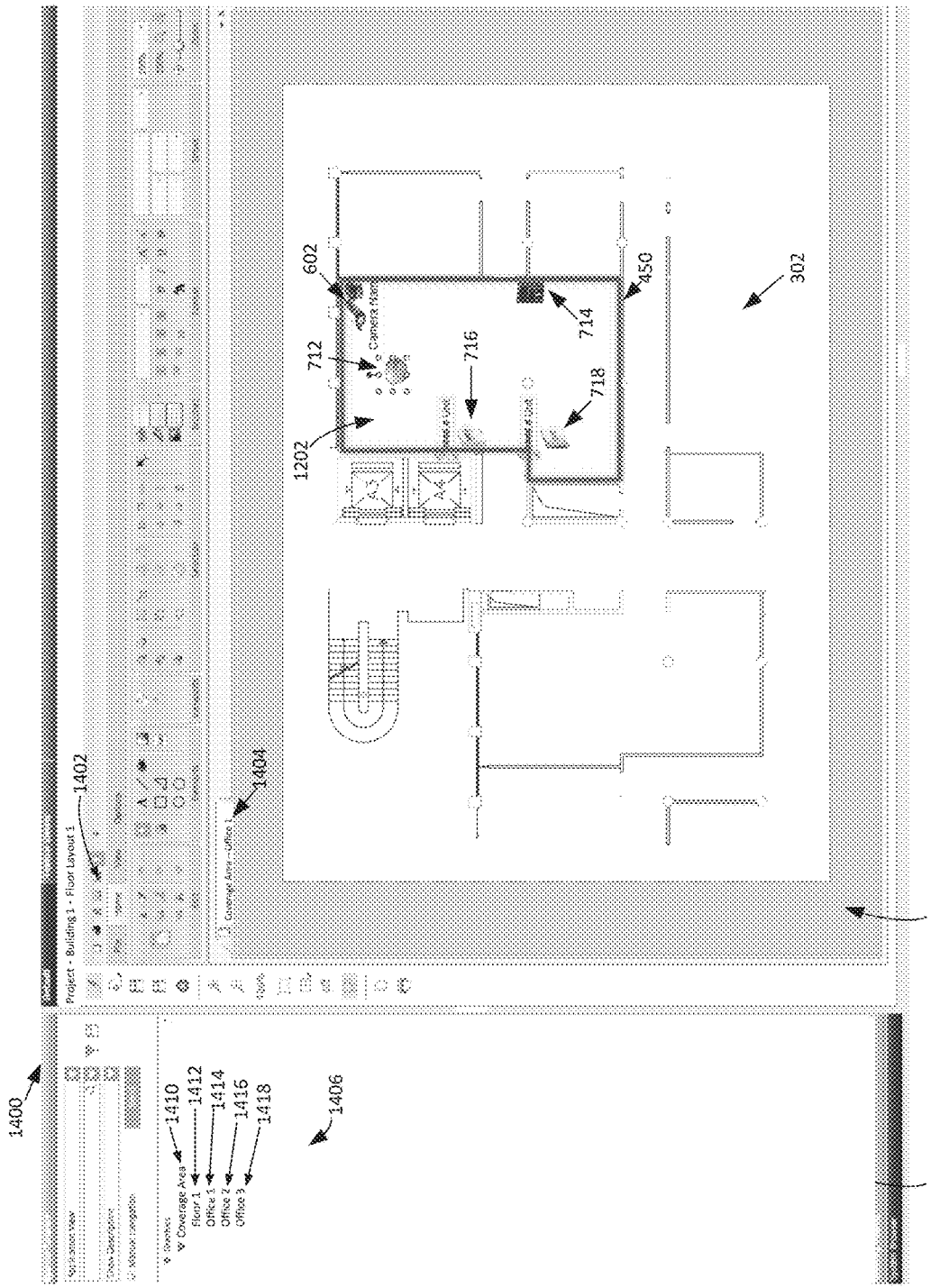
FIG. 14 illustrates an exemplary screen capture of the graphical user interface for selectively identifying the coverage area graphic in FIG. 12 in relation to symbols associated with devices within the building for further processing using the system manager application in accordance with disclosed embodiments.

Turning to FIG. 14, an exemplary screen capture of the graphical user interface 1400 is shown for selectively identifying the coverage area graphic 1202 in relation to symbols 712-718 associated with devices and device objects (corresponding to device object identifiers 702-708 in FIG. 13) within the building for further processing using the system manager application 228 in accordance with disclosed embodiments. The graphical user interface 1400 is an example of the graphical user interface 300 still in an editor mode and consistent with the graphical user interface 1300 in FIG. 13. In this illustrative embodiment, a user may prompt the data processing system 200 and the system manager application 208 via a save icon 1402 of the graphical user interface 1400 to save and store the coverage area graphic 1202 in association with the building graphic 302 for access when returning to the editor mode or during a runtime mode. The data processing system 200 and the system manager application 208 may also prompt the user via the graphic user interface 1400 for a name for the coverage area graphic 1202 (e.g., "Office 1" in FIG. 14), which may be subsequently displayed as an identification 1404 in association with the coverage area graphic 1202 and the associated building graphic 302. Coverage area graphics and building graphics may be stored in a hierarchical structure library (e.g., in database 124). In the example shown in FIG. 14, a hierarchical structure 1406 of graphic object identifiers 1410, 1412, 1414, 1416 and 1418 stored in the database 124 may be retrieved and displayed in the system browser pane or window 304 (also referenced as the "system browser" pane or window) for selective access by the user. In this illustrative example, the graphic object identifier 1410 identifies the "coverage area" graphics within the hierarchical structure 1406 of graphic object identifiers stored in the database 124. The graphic object identifier 1412 corresponds to the building graphic 302 (e.g., identified as "Floor 1") and the graphic object identifiers 1414-1418 identify the respective coverage area graphics that have been defined in association with the building graphic 302 in accordance with the disclosed embodiments. For example, the graphic object identifier 1414 corresponds to the coverage area graphic 1202 (e.g., identified as "Office 1") in FIGS. 11-17. The other graphic object identifiers 1416 and 1418 each correspond to a respective coverage area graphic defined in accordance with the disclosed embodiments.

Figure 15:
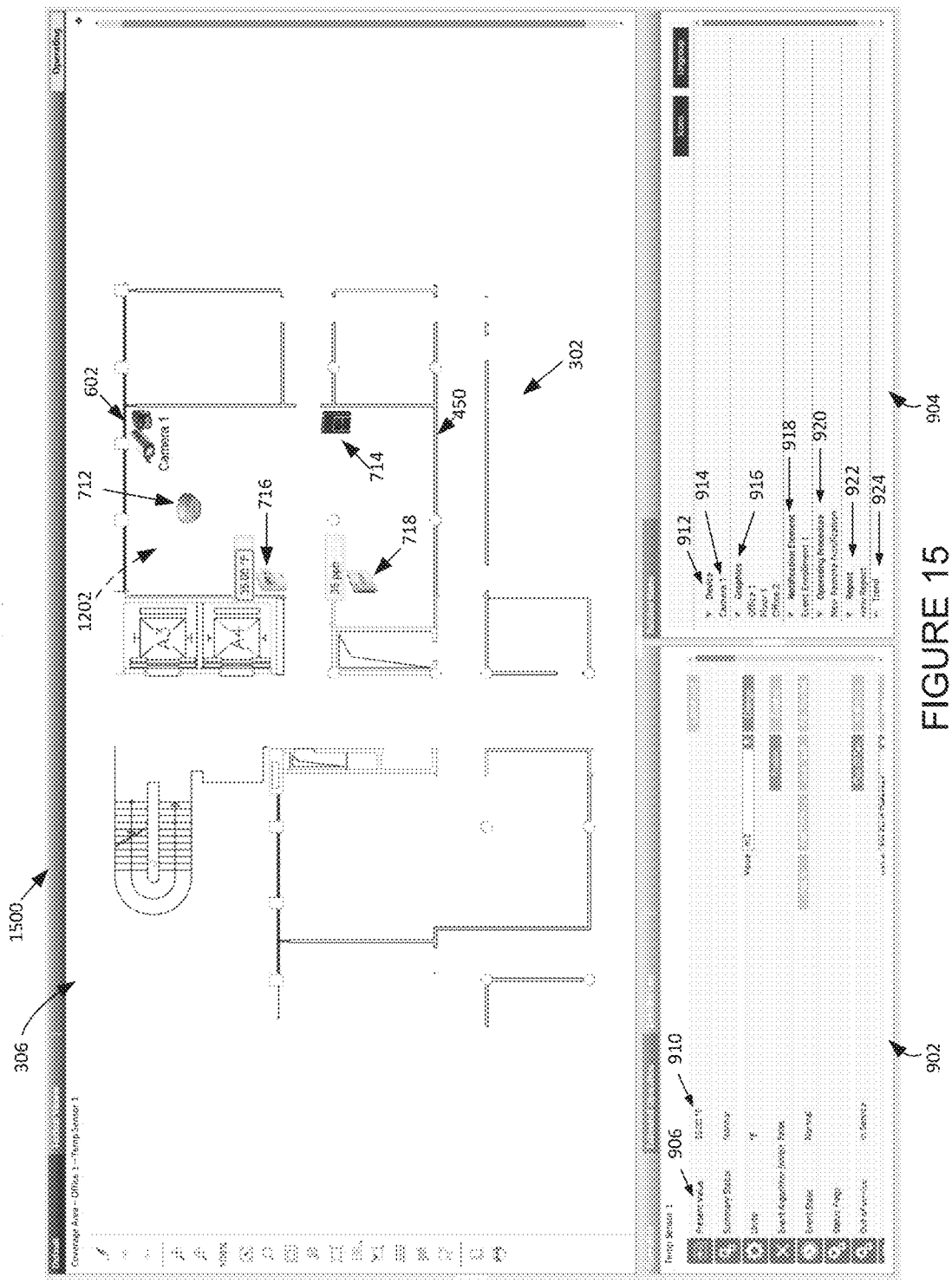
FIG. 15 illustrates an exemplary screen capture of the graphical user interface for selectively identifying one of the device symbols associated with the coverage area graphic in FIG. 12 and displaying identifiers of related items associated with the device corresponding to the identified device symbol using the system manager application in accordance with disclosed embodiments.
Figure 16:
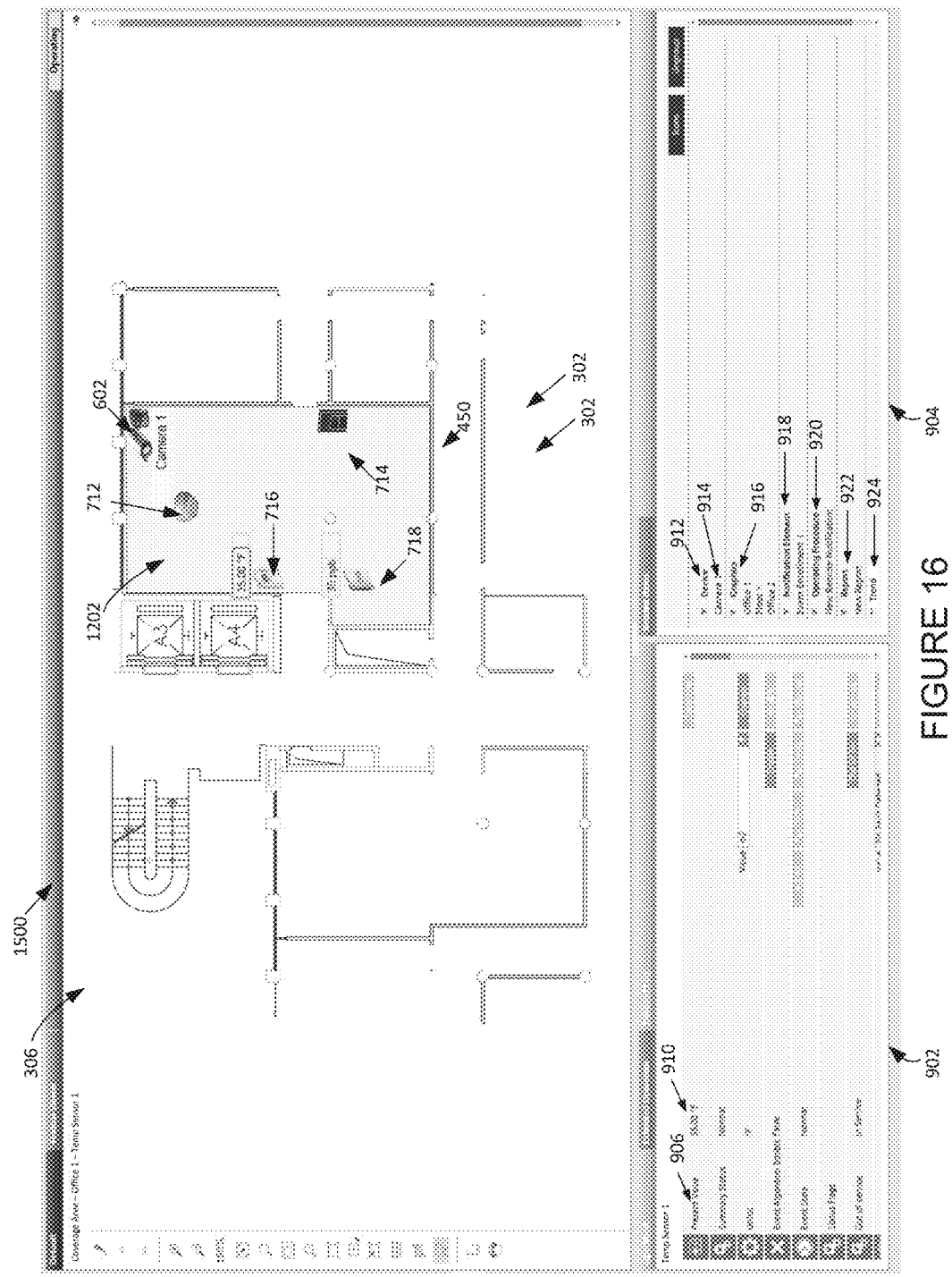
FIG. 16 illustrates an exemplary screen capture of the graphical user interface for selectively displaying the coverage area graphic in FIG. 12 in relation to symbols associated with devices within the building and displaying identifiers of related items associated with the device corresponding to the current or last identified device symbol using the system manager application in accordance with disclosed embodiments.

After a coverage area graphic (e.g., 1202) is defined relative to a building graphic (e.g., 302) based on a coverage zone of the monitoring device (e.g., represented by the coverage zone graphic 1102 in FIG. 11) and each related item identifier of each monitoring device (e.g., as represented by a corresponding symbol 602) associated with the coverage area graphic 1202 is stored as a property of each building device object (e.g., 250A-250E) having a corresponding building device symbol within the coverage area graphic 1202, a user using the graphical user interface as shown in FIG. 15 may selectively identify one of the building device symbols and cause the data processing system 200 and system manager application 228 to display (via the graphical user interface 1500 in FIG. 1500) the related item identifiers associated with the device corresponding to the identified device symbol. The graphical user interface 1500 depicted in FIG. 15 is an example of the graphical user interface 300 in a runtime mode and is consistent with the graphical user interface 1400 in editor mode. In this illustrative embodiment, the graphical user interface 1500 comprises a multi-area or multi-pane display window displayed on a display device (e.g., display 211 in FIG. 2). The graphical user interface 1500 includes a display of the user selected building graphic 302 displayed in the primary window 306 with the monitoring device symbol 602 and building device symbols 712-718 displayed relative to the space or room 450 consistent with the respective location of each of such symbols within the coverage area graphic 1202 as defined by the user in accordance with the disclosed embodiments. In FIG. 15, the user has not prompted the system manager application via the graphic user interface 1500 to display the coverage area graphic 1202 (as reflected by the dashed reference arrow for 1202). In one embodiment depicted in FIG. 16, the user may use a mouse or other pointer device to select anywhere in the space or room 450 to cause the corresponding coverage area graphic 1202 to be displayed by the system manager application 228 relative to the space or room 400 as previously defined.

Continuing with FIG. 15, when the user selects one of the building device symbols 716-718 associated with the coverage area graphic 1202, the data processing system 200 and system manager application 228 display properties of the corresponding building device object (e.g., identified by the respective object identifier 702-708 in FIG. 15) in a second pane or window 902, and display related item identifiers associated with the building device object in a third pane or window 904. For example, as shown in FIG. 15, the temperature sensor device symbol 716 is selected causing the data processing system 200 and system manager application 228 to: (1) display the properties of the corresponding building device object (identified by the "temperature sensor 1" object identifier 706 in FIG. 15) in the second pane 902, and (2) display the related item identifiers associated with the corresponding temperature sensor 1 device object in accordance with the related item category of monitoring devices 912 as well as other related item categories such as graphics 916, notification element 918, operating procedure 920, report 922 and trends 924. Continuing with the example shown in FIG. 15, in pane 902, the "Present Value" identifier 906 is displayed in association with the corresponding value 910 (e.g., present value of 35.00° F.) for the temperature sensor device object associated with the selected temperature sensor device symbol 716 in pane 306. In pane 904, the related item identifier 914 (e.g., "camera 1") is displayed below the related item monitoring device category 912. The related item identifier 914 (e.g., (represented by its symbol 602) that was previously associated with the coverage area graphic 1202 in accordance with the disclosed embodiments, where the coverage area graphic 1202 is selectively defined based on the coverage zone (e.g., represented by the coverage zone graphic 1102 in FIG. 11) associated with the monitoring device and the dimensions of the space or room 450. Other related item identifier categories (e.g., graphics 916, notification element 918, operating procedure 920, report 922 and trend 924) are also displayed to indicate other related items that are associated with the device object corresponding to the selected device symbol (e.g., temperature sensor device symbol 716) in pane 306.

Figure 17:
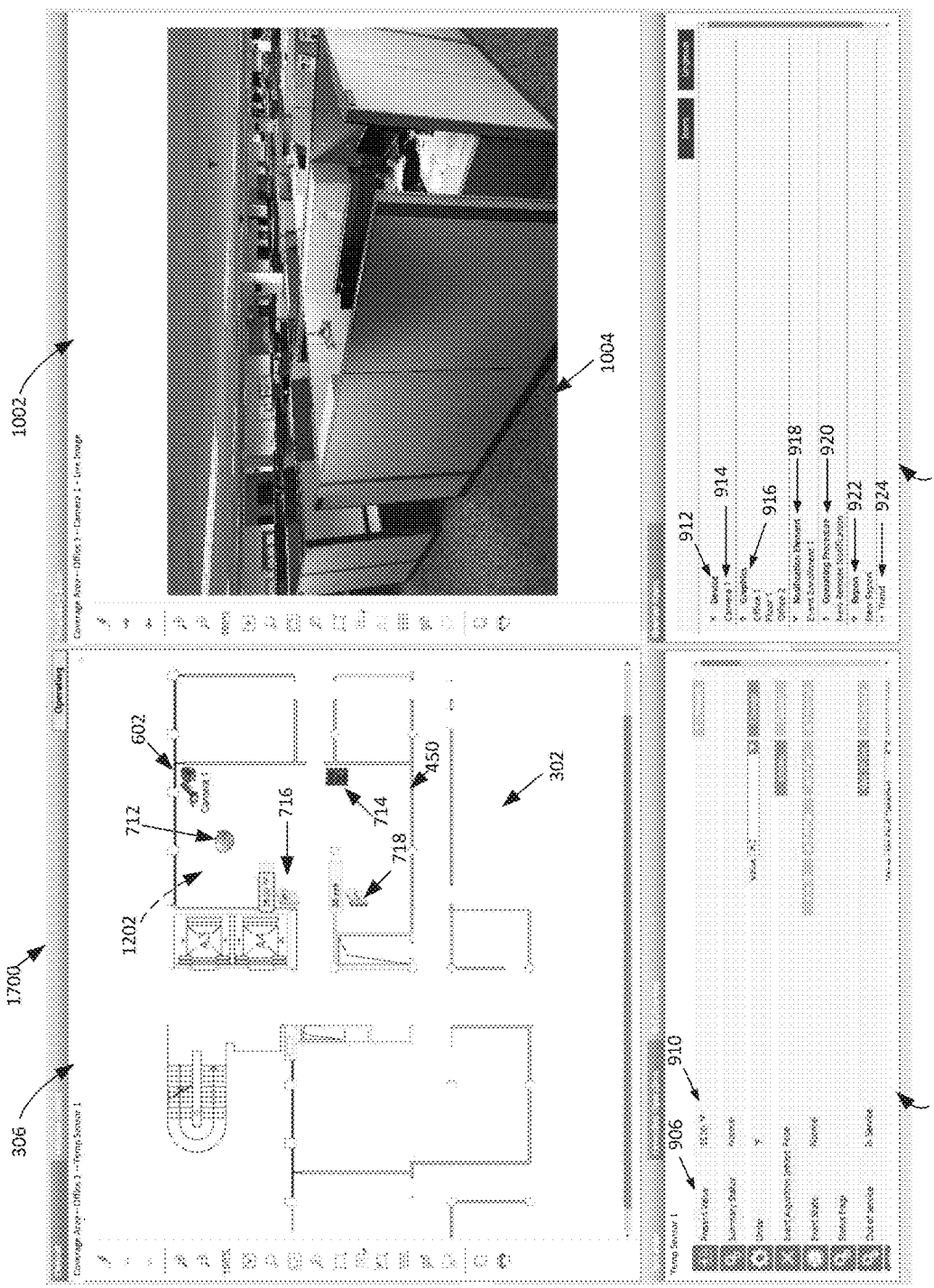
FIG. 17 illustrates an exemplary screen capture of the graphical user interface for selecting one of the related item identifiers displayed in FIG. 15 and displaying the related item corresponding to the selected related item using the system manager application in accordance with disclosed embodiments.

Upon selecting a related item identifier (e.g., 914 for "camera 1" in FIG. 15) corresponding to the monitoring device and object (represented by its symbol 602), the data processing system 200 and system manager application 228 generate and display the corresponding related item 1004 in a fourth pane or window 1002 of the graphical user interface 1700 as depicted in FIG. 17 (where the graphical user interface 1700 is another example of the graphical user interface 300 that is consistent with the graphical user interface 1500 in FIG. 15 and is similar to the graphical user interface 900 in FIG. 9, each in a runtime mode). In this illustrative example, the related item 1004 is a live camera image received by the data processing system 200 and the system manager application 228 from the "camera 1" monitoring device object (e.g., 250A in FIG. 2) having the related item identifier 914 and that was previously associated with the coverage area graphic 1202 in accordance with the disclosed embodiments. Thus, the disclosed embodiments, enable a related item of a monitoring device (e.g., such as represented by "camera 1" 602) to be quickly and conveniently associated with other building devices that are selectively associated with the same coverage area graphic 1202 representing the coverage zone (or corresponding coverage zone graphic 1102 depicted in FIG. 11) of the applicable monitoring device.

Often a space or room in a building may have more than one monitoring device that a user may want to associate with another building device that is located in proximity to both monitoring devices in order to view related items associated with the respective monitoring devices when the other building device is in an alarm state or other state (e.g., signaling a failure) where viewing the related item associated with the two monitoring devices would be helpful to confirming or assessing the alarm state or other state signaled by the other building device. The approach described in the following embodiments enable a user to easily and quickly define a coverage area graphic based on coverage zones associated with two or more monitoring devices and cause the data processing system 200 and system manager application 228 to automatically assign related item identifiers associated with the monitoring devices to building devices within the defined coverage area graphic.

Figure 18:
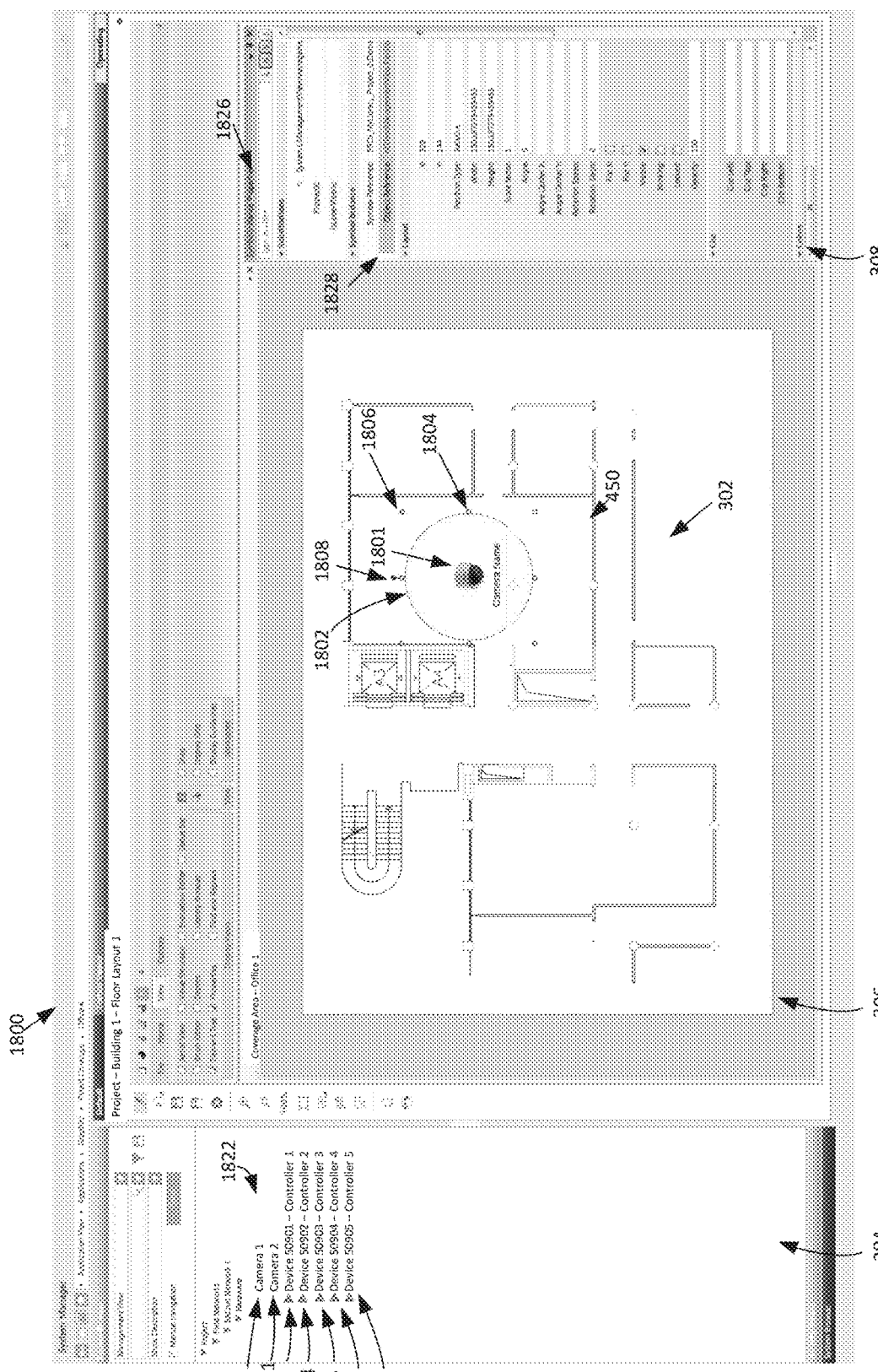
FIG. 18 illustrates an exemplary screen capture of the graphical user interface for selectively associating a first monitoring device having a first pre-defined coverage zone in relation to the pre-defined space in the building using the system manager application in accordance with disclosed embodiments.

Turning now to FIG. 18, an exemplary screen capture of the graphical user interface 1800 is shown for selectively associating a first monitoring device having a first pre-defined coverage zone in relation to the pre-defined space in the building using the system manager application 228 in accordance with disclosed embodiments. In this illustrative embodiment, the graphical user interface 1800 is another example of the graphical interface 300 generated by the data processing system 200 and the system manager application 228. In the example shown in FIG. 18, the graphical user interface 1800 is in an editor mode. The graphical user interface 1800 includes a display of a building graphic 302 in window 306 that depicts a graphical representation of a floor layout of a building. A hierarchical structure 1822 of data objects identifiers 310, 1811 and 312-320 referencing data objects 250A-250N corresponding to devices 116, 118 and 120 within the management system 100 is again displayed in the system browser pane or window 304 of the graphical user interface 1800. In the embodiment shown in FIG. 18, the object 1811 corresponds to another monitoring device (e.g., identified as "camera 2" in FIG. 18) that may be installed in a building represented by the building graphic 302 as a device 116, 118 or 120 managed by the management system 100. The object 1811 may include a property that identifies the corresponding "camera 2" as a monitoring device, recognized by the system manager application 228. In this embodiment, the processor 202 under the control of the system manager application 228 receives a request to generate a coverage area graphic to be associated with one or more monitoring devices via the graphical user interface 1800 upon a user selection of the monitoring device object identifier (e.g., 1811 for "camera 2") and a separate selection of the space or room 450 of the building graphic 302. In the example shown in FIG. 1800, the user may select the "camera 2" monitoring device object identifier 1811 using a mouse or other pointing device and drag and drop the selected object identifier 1811 to a location within the space or room 450. In response, the system manager application 228 recognizes the request to generate a coverage area graphic and displays a symbol (e.g., 1801) corresponding to the selected monitoring device over the building graphic 302 based on the location received from the user. As described herein, the system manager application 228 may identify the object identifier (e.g., 1811 for "camera 1" in FIG. 18) as a monitoring device based on the corresponding object having a "coverage zone" property. The "coverage zone" identifies a corresponding coverage range and volume associated with the respective monitoring device to the data processing system 200 and system manager application 228. In the embodiment shown in FIG. 1800, in conjunction with displaying the symbol (e.g., 1801) of the selected monitoring device object identifier 1811, the system manager application displays a coverage zone graphic 1802 corresponding to the coverage range and volume identified by the "coverage zone" property of the identified monitoring device object.

When the coverage zone graphic does exceed a dimension of the selected space or room 450, the data processing system 200 and the system manager application 228 may prompt the user whether the coverage zone graphic 1802 should be modified or limited to fit within the selected space or room 450. The prompt may be conveyed to the user by flashing the coverage zone graphic 1802 on and off, providing a dialog box to receive a yes or no input from the user, or any other known input technique.

The data processing system 200 and system manager application 228 may verify that the coverage zone of the monitoring device and corresponding to the coverage zone graphic 1802 does not exceed the size and dimensions of the selected space or room 450. As previously described, the dimensions of the space or room 450 may be stored as properties of the building graphic 302 or provided in a related configuration file (not shown in the figures) associated with the building floor layout represented by the building graphic 302 that is stored in database 124 or memory 208 for access by the system manager application 228. In another embodiment, a user may use a mouse or other pointing device to select and drag graphic manipulation points (e.g., 1804, 1806, 1808 and other manipulation points) of the coverage zone graphic 1802 to modify or adjust the corresponding dimensions of the coverage zone graphic 1802 relative to the dimensions of the space or room 450 of the building graphic 302. Alternatively, the system manager application may display a properties editor 1806 in pane 308 of the graphic user interface 1800 for a user to change dimensions of the coverage zone graphic 1802 to fit within the selected space or room 450 of the building graphic 302. The properties of the coverage zone graphic 1802 may include an "object reference" property 1828 that includes an identification or link to the instance of the coverage zone graphic 1802 stored by the system manager application 228 for later access.

Figure 19:
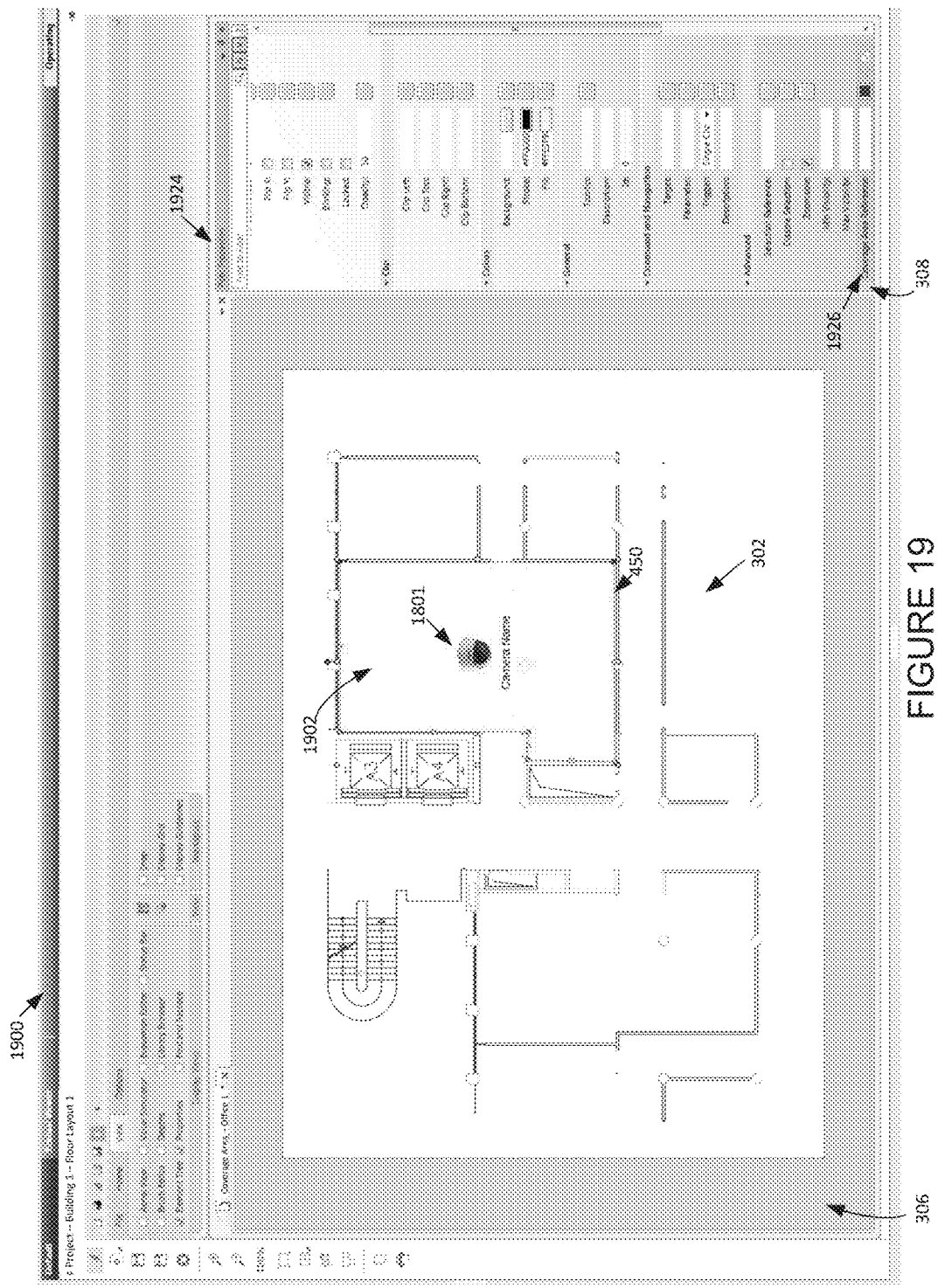
FIG. 19 illustrates an exemplary screen capture of the graphical user interface displaying a graphical representation of a coverage area generated using the system manager application based on the first pre-defined coverage zone of the monitoring device in FIG. 18 and the pre-defined space in the building in accordance with disclosed embodiments.

Turning to FIG. 19, an exemplary screen capture of the graphical user interface 1900 is shown displaying a graphical representation 1902 of a coverage area (also referenced as coverage area graphic 1902) generated using the system manager application 228 based on the pre-defined coverage zone 1802 of the monitoring device corresponding to the symbol 1801 associated with the selected space or room 450 in the building in accordance with disclosed embodiments. In this illustrative embodiment, the graphical user interface 1900 is another example of the graphical interface 300 in editor mode generated by the data processing system 200 and the system manager application 228 to be consistent with the graphical interface 1800 in FIG. 18. In the example shown in FIG. 19, after verifying that the coverage zone (represented by the coverage zone graphic 1802) of the monitoring device exceeds a dimension of the selected space or room 450 and after receiving a response to a user prompt to fit the coverage zone graphic 1802 to the selected space or room 450, the system manager application generates the coverage area graphic 1902 based on the coverage zone 1802 modified to fit within the selected space or room 450 of the building graphic 302. Although the coverage area graphic 1902 as shown in FIG. 19 completely fills the total area defined by the wall dimensions of the selected space or room 450, the coverage area graphic 1902 may be generated and displayed to be less than the total area of the selected space or room 450 based on the range and volume of the coverage zone stored as the "coverage zone" property of the applicable monitoring device object represented by the symbol 1801 placed within the selected space or room 450 of the building graphic 302 in accordance with the disclosed embodiments.

When the coverage area graphic 1902 is displayed, the data processing system 200 and system manager application 228 may also display a graphic properties editor 1924 in window 308 of the graphic user interface 1200 to enable a user to edit property fields for the coverage area graphic 1902. The properties of the coverage area graphic 1902 include a "coverage area reference" identified as 1926 in FIG. 19. The "coverage area reference" references the monitoring device to be associated with the coverage area graphic 1902.

Figure 20:
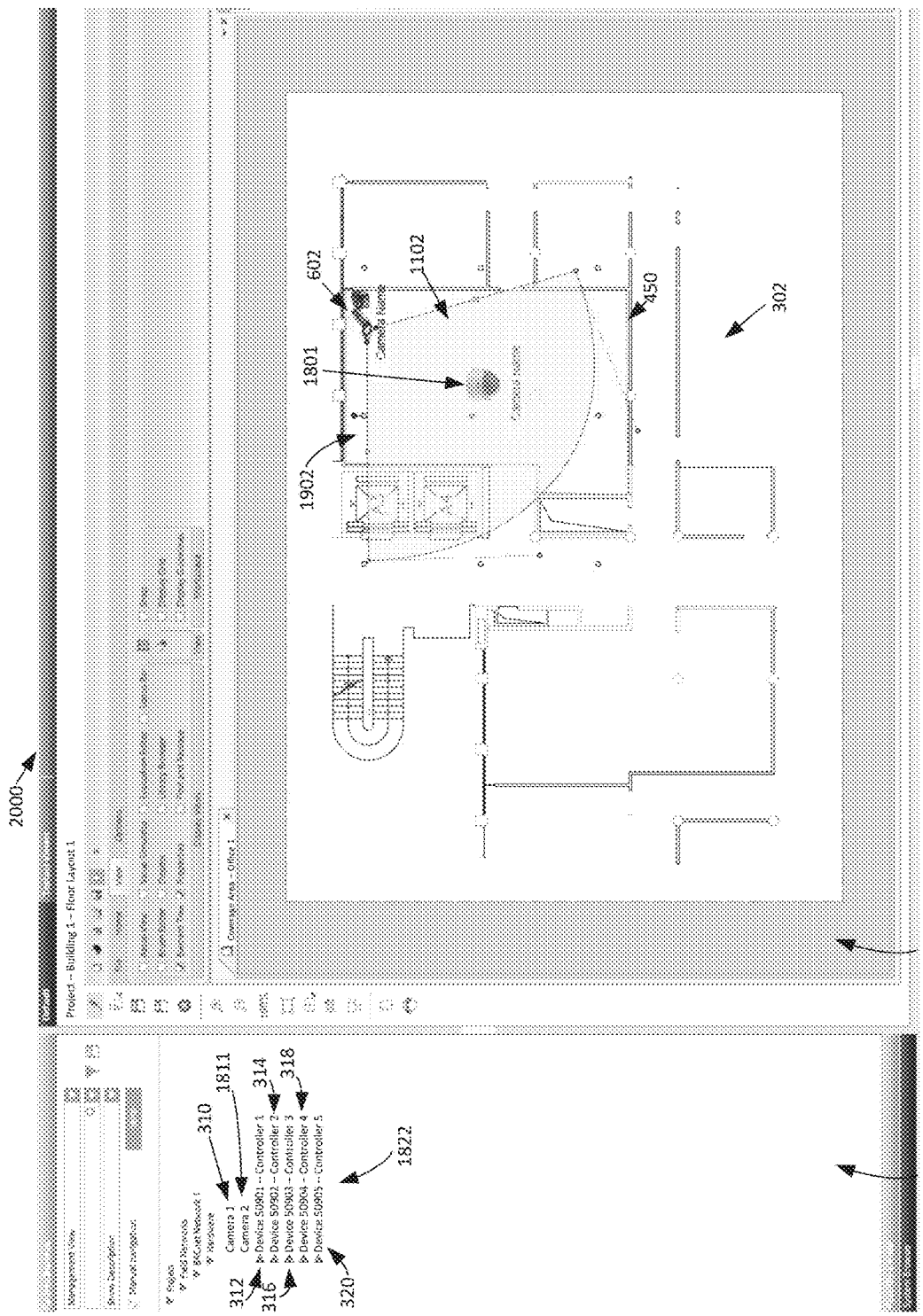
FIG. 20 illustrates an exemplary screen capture of the graphical user interface for selectively associating a second monitoring device having a second pre-defined coverage zone in relation to the coverage area and the pre-defined space in the building using the system manager application in accordance with disclosed embodiments.

As shown in FIG. 20, the data processing system 200 and the system manager application 228 enables a user to identify a second monitoring device (represented by the monitoring device symbol 602) having a second pre-defined coverage zone (represented by the coverage zone graphic 1102) to be associated with the same coverage area graphic 1802 as the first monitoring device (represented by the monitoring device symbol 1801) having the first pre-defined coverage zone (represented by the coverage zone graphic 1802 in FIGS. 18 and 19). In the illustrative embodiment shown in FIG. 20, the graphical user interface 2000 is another example of the graphical interface 300 in editor mode generated by the data processing system 200 and the system manager application 228 to be consistent with the graphical user interface 1800 in FIG. 18 and the graphical user interface 1900 in FIG. 19.

In the illustrative embodiment depicted in FIG. 20, the user may select the "camera 1" monitoring device object identifier 310 using a mouse or other pointing device and drag and drop the selected identifier 310 to a location within the space or room 450 and within the coverage area graphic 1802 previously associated with the space or room 450. In performing this input technique, the data processing system 200 and system manager application 228 receive via the graphic user interface 2000 the identification of the second monitoring device corresponding to the object identifier 310, and the user selected location of the identified second monitoring device relative to the identified space or room 450. The data processing system 200 and system manager application 228 also identify the second coverage zone associated with the identified second monitoring device by accessing the "coverage zone" property of the device object (e.g., 250F in FIG. 2) that corresponding to the selected object identifier 310 of the second monitoring device. In the embodiment shown in FIG. 2000, in conjunction with displaying the symbol (e.g., 602) of the selected second monitoring device object, the system manager application generates and displays the second coverage zone graphic 1102 corresponding to the coverage range and volume identified by the "coverage zone" property of the second monitoring device object (e.g., corresponding to the selected object identifier 310) at the user selected location for the identified second monitoring device.

The data processing system 200 and system manager application 228 may verify that the second coverage zone of the second monitoring device and corresponding to the coverage zone graphic 1102 does not exceed the size and dimensions of the selected space or room 450 in the same manner as described herein for the first monitoring device. When the second coverage zone graphic 1102 exceeds a dimension of the selected space or room 450, the data processing system 200 and the system manager application 228 may prompt the user whether the second coverage zone graphic 1102 should be modified or limited to fit within the selected space or room 450. The prompt may be conveyed to the user by flashing the coverage zone graphic 1102 on and off, providing a dialog box to receive a yes or no input from the user, or any other known input technique.

Figure 21:
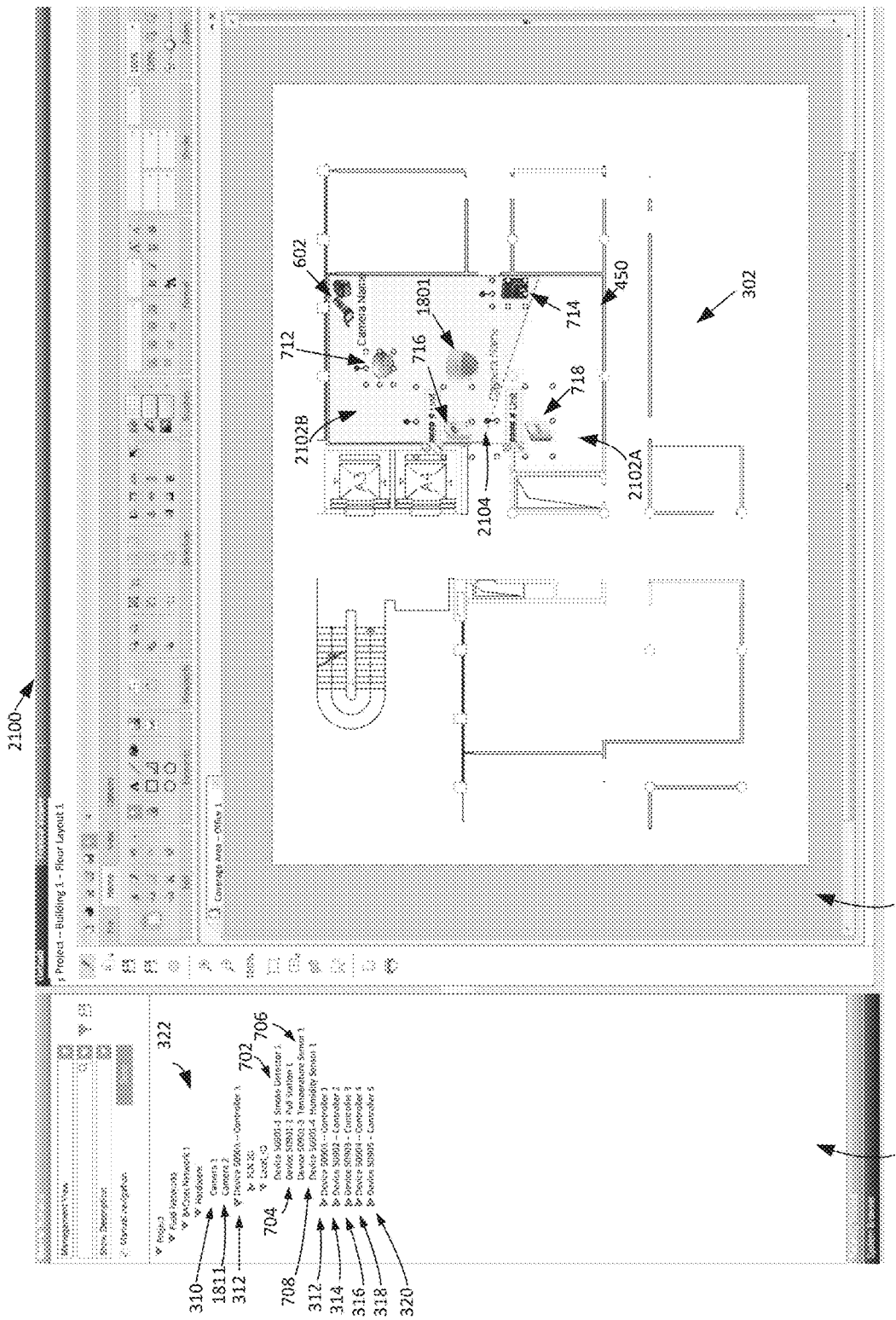
FIG. 21 illustrates an exemplary screen capture of the graphical user interface where the coverage area graphic is displayed to reflect the first coverage zone and the second coverage zone and where symbols corresponding to devices within the building are selectively associated with the coverage area graphic using the system manager application in accordance with disclosed embodiments.

Turning to FIG. 21, an exemplary screen capture of the graphical user interface 2100 is shown where the coverage area graphic (2102A & 210B) is displayed to reflect the first coverage zone and the second coverage zone and where symbols corresponding to devices within the building are selectively associated with the coverage area graphic in accordance with disclosed embodiments. In the illustrative embodiment, the graphical user interface 2100 is another example of the graphical interface 300 in editor mode generated by the data processing system 200 and the system manager application 228 to be consistent with the graphical user interface 2000 in FIG. 20. In this embodiment, when the data processing system 200 and system manager application 228 determine that the second coverage zone of the second monitoring device does not exceed any dimension of the selected space or room, the system generates and displays the graphical representation of the collective coverage area (e.g., 2102A and 2102B) based on the first coverage zone of the first monitoring device (e.g., as represented by the first coverage zone graphic 1802) and the second coverage zone of the second monitoring device (e.g., as represented by the second coverage zone graphic 1102). Alternatively, if the data processing system 200 and system manager application 228 determines that the second coverage zone of the second monitoring device (as represented by the second coverage zone graphic 1102 in FIG. 20) does exceed a dimension of the selected space or room, the data processing system 200 and system manager application 228 generates the collective coverage area graphic (e.g., 2102A and 2102B) based on the first coverage zone of the first monitoring device (e.g., as represented by the first coverage zone graphic 1802) and the second coverage zone of the second monitoring device (e.g., as represented by the second coverage zone graphic 1102) modified to not exceed the dimension of the selected or identified space or room 450 as shown in FIG. 21. A graphic line 2104 may also be displayed by the system manager application 228 via the graphical user interface 2100 to visually distinguish or identify a separation in the range or coverage of the second coverage zone graphic and the first coverage zone graphic.

In the embodiment shown in FIG. 21, the graphic line 2104 indicates that the second coverage zone graphic 2102B associated with the second monitoring device (represented by the device monitoring symbol 602) is smaller than the first coverage zone graphic 2102A associated with the first monitoring device (represented by the device monitoring symbol 1801). However, the second coverage zone graphic 2102B may be greater than the first coverage zone graphic 2102A depending on user input manipulations of the respective coverage zone graphics and the coverage zone property of the respective monitoring device object (e.g., corresponding to device object identifiers 310 and 311). In addition, the data processing system 200 and the system manager application 228 may generate the collective coverage area graphic (2102A and 2102B) to be two separate and distinguishable graphic layers comprised of the first coverage area zone 2102A and the second coverage area zone 2102B modified to fit within the selected space or room 450 in accordance with the disclosed embodiments.

Continuing with the illustrative embodiment depicted in FIG. 21, the data processing system 200 and system manager application 228 may receive via the graphical user interface 1300 a user input or request to associate or assign a building device and/or its respective symbol to the collective coverage area graphic 2102A and 2102B by using a mouse (or other pointing device) to select the corresponding object identifier in the system browser pane or window 304 of the graphic user interface 2100 and then drag and drop the selected object identifier within the collective coverage area graphic 2102 or a respective one of the coverage zone graphics 2102A or 2102B comprising the collective coverage area graphic 2102. In the example shown in FIG. 21, a user using this input technique with the graphical user interface 2100 has selected each of the object identifiers 702-706 in the system browser pane 304 (corresponding to building devices 250B-250D in FIG. 2 identified as "Device 50901-1 Smoke Detector 1", "Device 50901-2 Pull Station 1", "Device 50901-3 Temperature Sensor 1") for placement within the portion of the collective coverage area graphic 2102 corresponding to the first coverage zone graphic 2101A and within the second coverage zone graphic 2101B that is placed as graphic layer over the portion of the first coverage zone graphic 2101A. In this example, a user has also selected the object identifier 708 in the system browser pane 304 (corresponding to building devices 250E in FIG. 2 Device 50901-4 Humidity Sensor 1") for placement within the portion of the collective coverage area graphic 2102 corresponding to the portion of the first coverage zone graphic 2101A that is not overlayed by the second coverage zone graphic 2101B.

In performing this input technique, the data processing system 200 and system manager application 228 receive via the graphic user interface 2100 the identification of each device corresponding to the object identifiers 702-708, and the user selected location of the respective identified device relative to the coverage area corresponding to the collective coverage area graphic 2102 and the respective coverage zone graphics 2102A and 2102B comprising the collective coverage area graphic 2102. In response, the data processing system 200 and system manager application 228 generate (or retrieve from the symbol library in database 124) the symbols 712-718 and displays via the graphic user interface 2100 each symbol 712-718 at the user selected location relative to the coverage area graphic 2102 and/or relative to the respective coverage zone areas 2102A and 2102B comprising the collective coverage area graphic 2102.

As previously disclosed, each building device object identified by an object identifier (e.g., 702-718 for "Smoke Detector 1", "Pull Station 1", "Temperature Sensor 1", "Humidity Sensor 1" in FIG. 21) may include a "building location" property that identifies to the data processing system 200 and system manager application 228 that the location of the applicable building device relative to the space or room of the building where the applicable building device is or will be installed. The "building location" property of the building device object may be used by the data processing system 200 and system manager application 228 to verify the location of the respective symbol (e.g., 712-718) corresponding to the building object identifier (e.g., 702-708) relative to the selected space or room (e.g., 450 in FIG. 7) and relative to the coverage area graphic 2102 (and/or its zone graphic components 2102A and 2102B) placement in the selected space or room 450. In response to determining that the user selected location of the respective symbol (e.g., 712-718) within the space or room (e.g., 450) and/or within the coverage area graphic 402 is not within a pre-determined tolerance (e.g., 0 to 1 foot scaled to a dimension of the building graphic 302), the system manager application 228 may automatically move or adjust the user selected location of the symbol to be within the pre-determined tolerance and re-display the symbol at the adjusted user selected location within the space or room (e.g., 450) and relative to the coverage area graphic 2102.

For each symbol 712-718 that the data processing system 200 and the system manager application 228 determine is within the coverage area graphic 2102 (and correspondingly confirms that each building device represented by the symbol 712-718 is within the coverage area represented by the coverage area graphic 2102), the data processing system 200 and the system manager application 228 automatically (1)

retrieve each related item identifier associated with each monitoring device associated with the coverage area graphic 2102 (and/or its respective coverage zone graphic components 2102A and 2102B), and (2) stores each related item identifier of each monitoring device associated with the coverage area graphic 2102 (or respective coverage zone graphic component 2102A or 2102B) as a property of each building device object (e.g., 250A-250E) corresponding to the symbols verified to be within the coverage area graphic 2102 (or within the respective coverage zone graphic component 2102A or 2102B).

Figure 22:
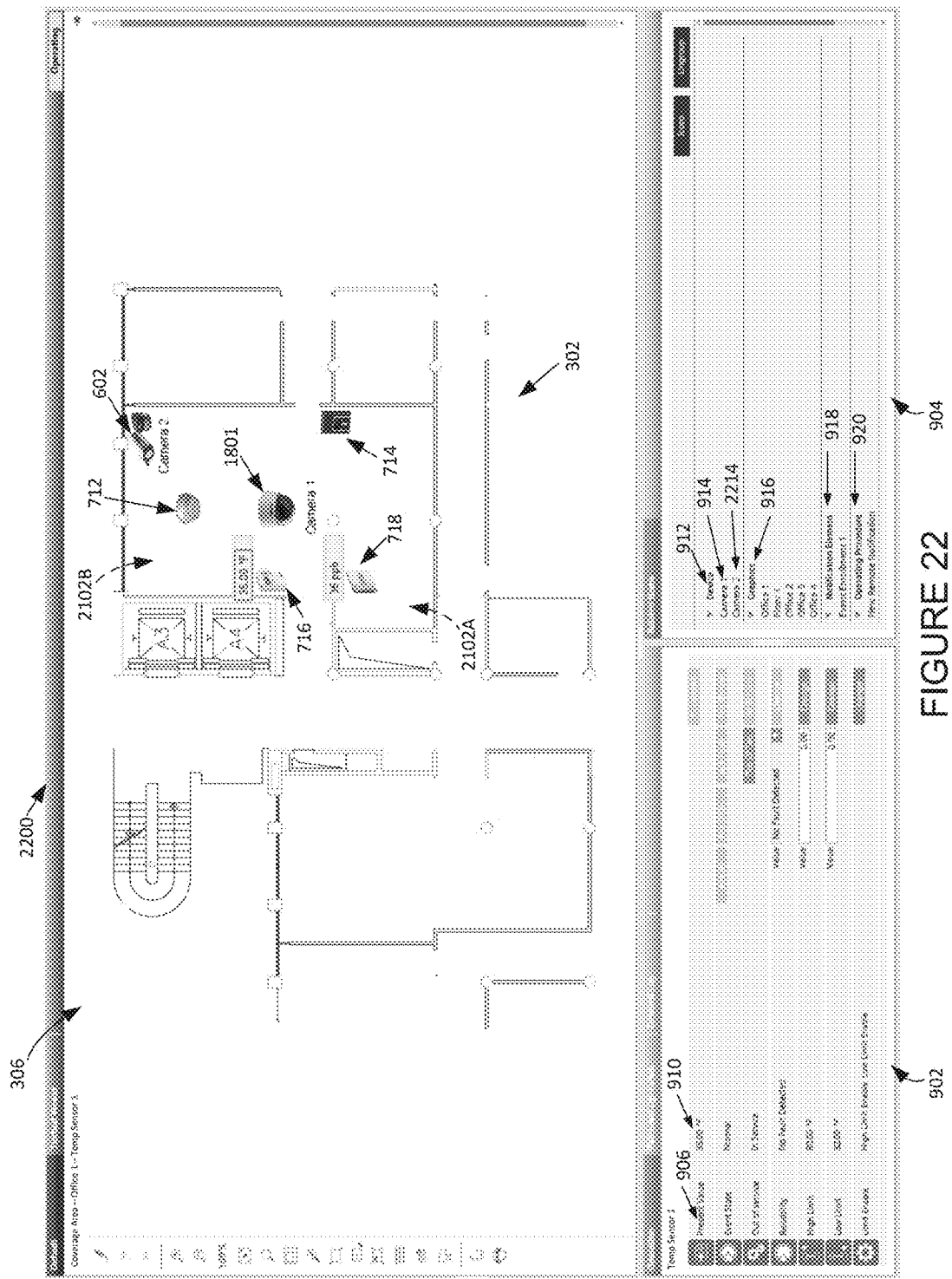
FIG. 22 illustrates an exemplary screen capture of the graphical user interface for selectively identifying one of the device symbols associated with the coverage area graphic in FIG. 21 and displaying identifiers of related items associated with the device corresponding to the identified device symbol using the system manager application in accordance with disclosed embodiments.

Turning to FIG. 22, an exemplary screen capture of the graphical user interface 2200 is shown for selectively identifying one of the device symbols 712-718 associated with the coverage area graphic 2102 (comprised of coverage zone graphics 2102A and 2102B layer components) and displaying identifiers of related items associated with the device corresponding to the identified device symbol in accordance with disclosed embodiments. The graphical user interface 2200 is an example of the graphical user interface 300 still in a runtime mode and is consistent with the graphical user interface 2100 in editor mode. In this illustrative embodiment, the graphical user interface 2200 comprises a multi-area or multi-pane display window displayed on a display device (e.g., display 211 in FIG. 2). The graphical user interface 2200 includes a display of the user selected building graphic 302 displayed in the primary window 306 with the first monitoring device symbol 1801, the second monitoring device symbol 602 and building device symbols 712-718 displayed relative to the space or room 450 consistent with the respective location of each of such symbols within the coverage area graphic 2102 (and its coverage zone graphic components 2102A and 2102B) as defined by the user in accordance with the disclosed embodiments. In FIG. 22, the user has not prompted the system manager application via the graphic user interface 1500 to display the coverage area graphic 1202 (as reflected by the dashed reference arrows for zone graphic components 2102A and 2102B). In one embodiment depicted in FIG. 23, the user may use a mouse or other pointer device to select anywhere in the space or room 450 to cause the corresponding coverage area graphic 2102 (and/or its respective coverage zone graphic components 2102A and 2102B) to be displayed by the system manager application 228 relative to the space or room 450 as previously defined. Other know input techniques may also be used (e.g., such as text command entry) to cause the coverage area graphic 2102 to be re-displayed relative to the space or room 450 of the building graphic 302. This re-display prompt or command of the coverage area graphic 2102 may also advantageously cause the system manager application 228 while in a runtime mode to re-display all the building device symbols 712-718 that are associated with the coverage area graphic so that the user can visually distinguish between other building device symbols that are not associated with the coverage area graphic.

Figure 23:
FIG. 23 illustrates an exemplary screen capture of the graphical user interface for selectively displaying the coverage area graphic in FIG. 21 in relation to symbols associated with devices within the building and displaying identifiers of related items associated with the device corresponding to the current or last identified device symbol using the system manager application in accordance with disclosed embodiments.

When the user selects one of the building device symbols 716-718 associated with the coverage area graphic 2102 (or one of its respective coverage zone graphic components 2102A or 2102B), the data processing system 200 and system manager application 228 display properties of the corresponding building device object (e.g., identified by the respective object identifier 702-708 in FIG. 21) in a second pane or window 902, and display related item identifiers associated with the corresponding building device object in a third pane or window 904. For example, as shown in FIGS. 22 and 23, the temperature sensor device symbol 716 is selected causing the data processing system 200 and system manager application 228 to: (1) display the properties of the corresponding building device object (identified by the "temperature sensor 1" object identifier 706 in FIG. 21) in the second pane 902, and (2) display the related item identifiers associated with the corresponding temperature sensor 1 device object in accordance with the related item category of monitoring devices 912 as well as other related item categories such as graphics 916, notification element 918, and operating procedure 920. Continuing with the example shown in FIGS. 22 and 23, in pane 902, the "Present Value" identifier 906 is displayed in association with the corresponding value 910 (e.g., present value of 35.00° F.) for the temperature sensor device object associated with the selected temperature sensor device symbol 716 in pane 306. In pane 904, the related item identifiers 914 (e.g., "camera 1") and 2214 (e.g., "camera 2") are displayed below the related item monitoring device category 912. The related item identifier 914 (e.g., "camera 1") corresponds to the identification of the first monitoring device and object (represented by its symbol 1802) that was previously associated with the coverage area graphic 2102 (and the first coverage zone graphic 2102A) in accordance with the disclosed embodiments. The related item identifier 2214 (e.g., "camera 2") corresponds to the identification of the second monitoring device and object (represented by its symbol 602 in FIG. 22) that was previously associated with the coverage area graphic 2102 (and the second coverage zone graphic 2102B). Thus, in this example, both of the related item identifiers associated with the respective monitoring device objects represented by the symbols 602 and 1801 are automatically associated with the building device object represented by the temperature sensor device symbol 716 and selectively displayed when the temperature sensor device symbol 716 is selected in accordance with the disclosed embodiments.

Figure 24:
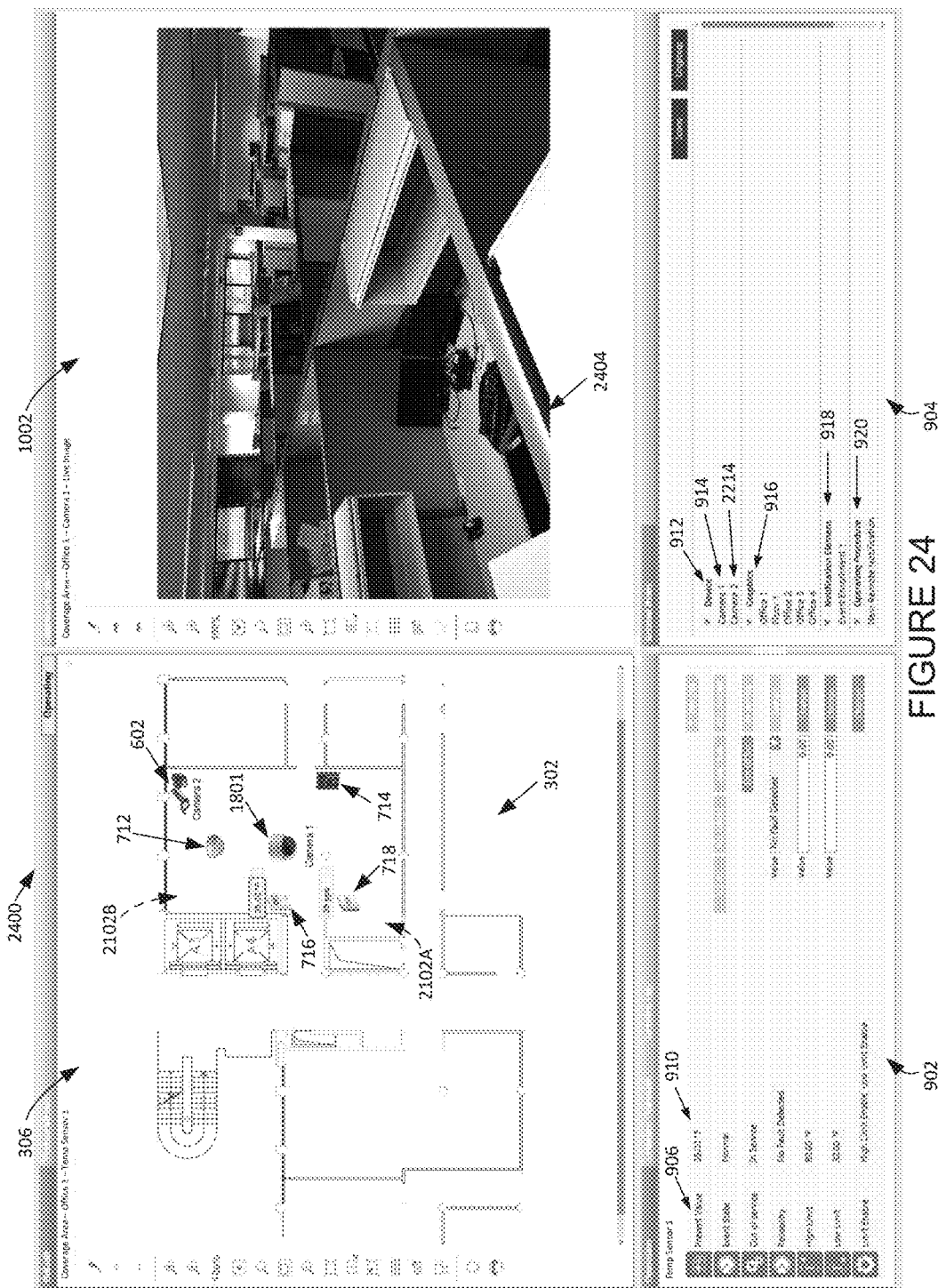
FIG. 24 illustrates an exemplary screen capture of the graphical user interface for selecting one of the related item identifiers displayed in FIGS. 22 and 23, and displaying the related item corresponding to the selected related item using the system manager application in accordance with disclosed embodiments.
Figure 25B:
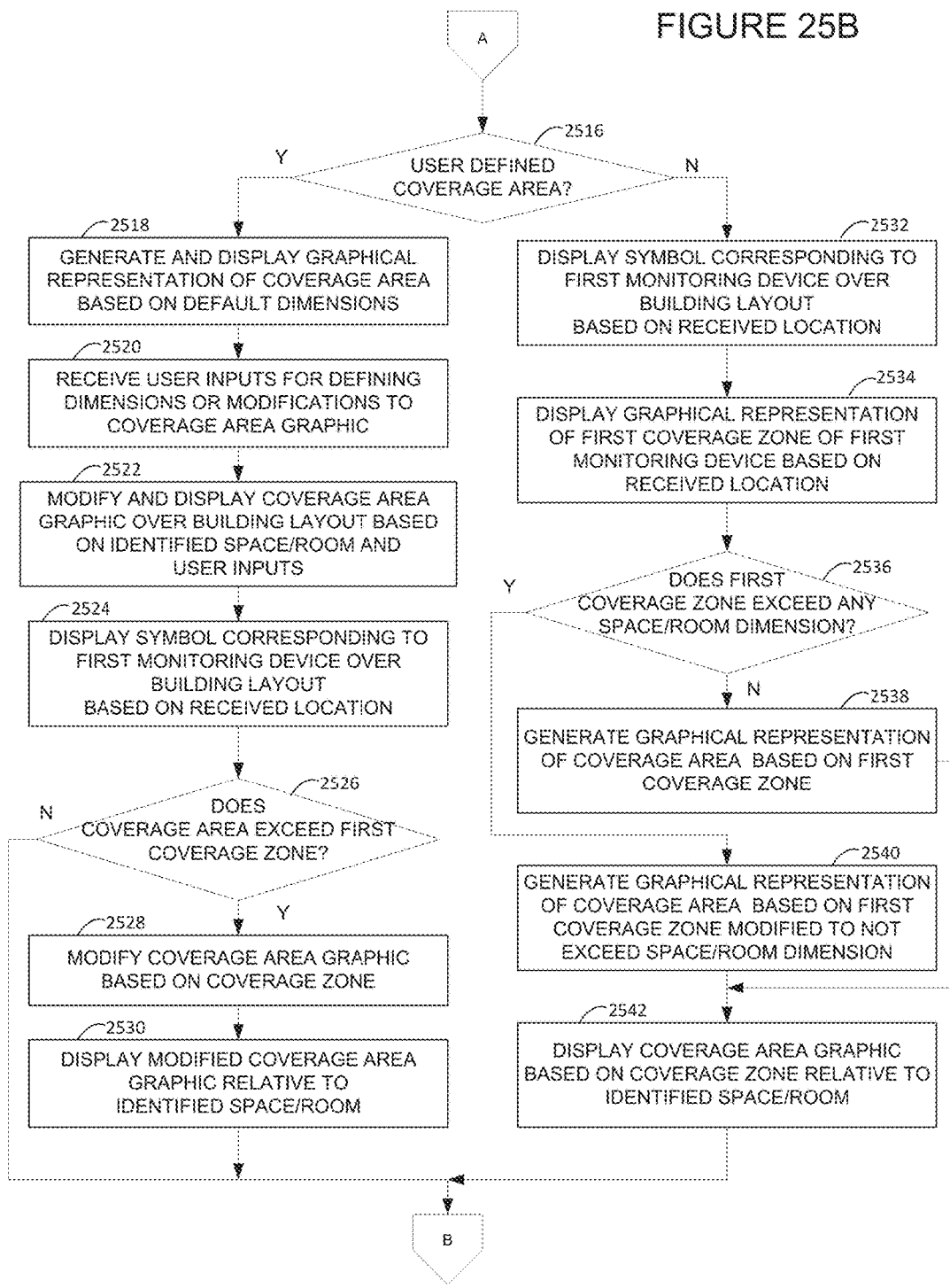
Figure 25C:
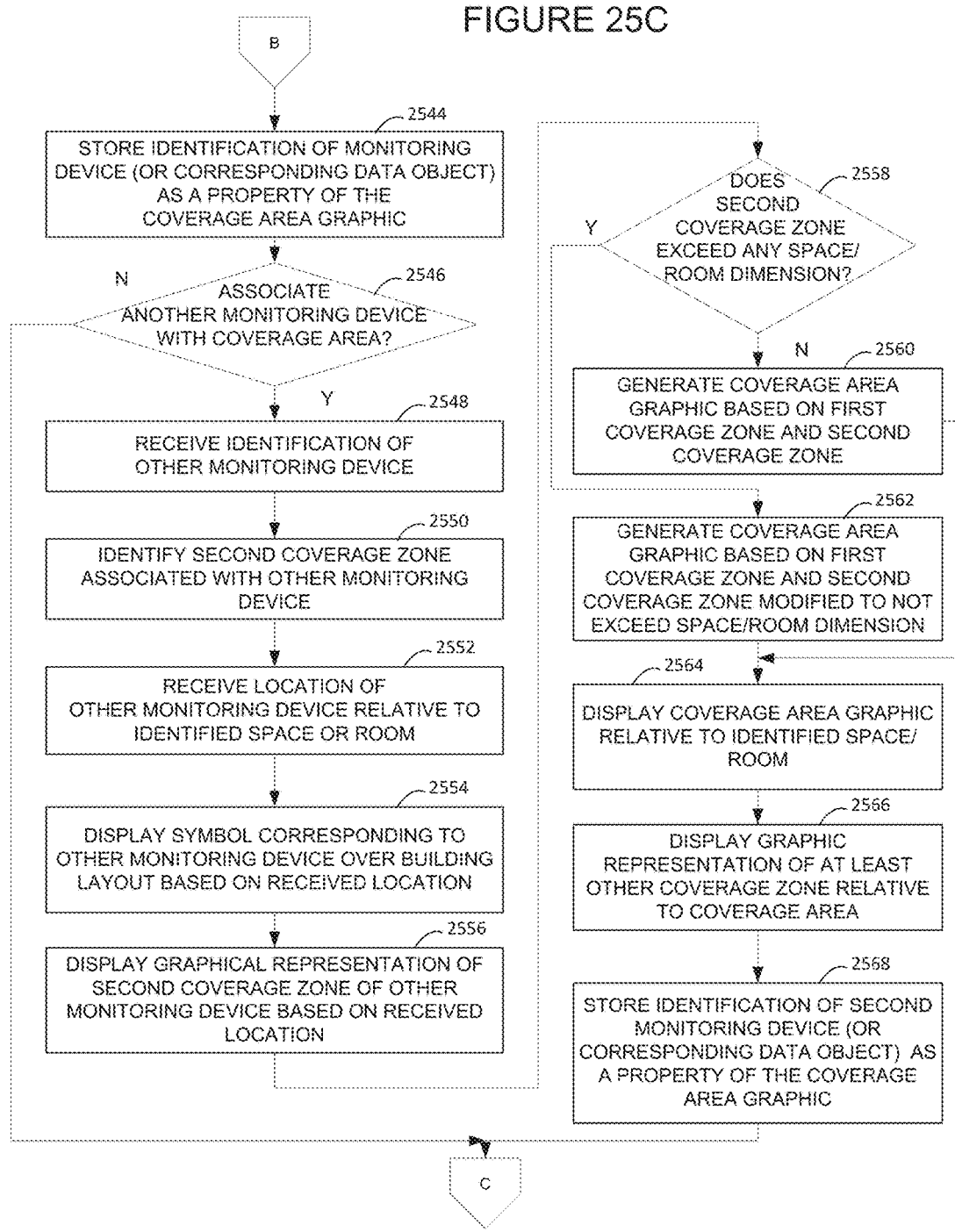

Upon selecting a related item identifier (e.g., 914 for "camera 1" in FIG. 23) corresponding to the first monitoring device and object (represented by its symbol 1801), the data processing system 200 and system manager application 228 generate and display the corresponding related item 2404 in a fourth pane or window 1002 of the graphical user interface 2400 as depicted in FIG. 24 (where the graphical user interface 2400 is another example of the graphical user interface 300 in a runtime mode that is consistent with the graphical user interface 2100 in editor mode in FIG. 21 and is similar to the graphical user interface 2200 in FIGS. 22 and 23, each in a runtime mode). In this illustrative example, the related item 2404 is a live camera image received by the data processing system 200 and the system manager application 228 from the "camera 1" monitoring device object (e.g., 250F in FIG. 2) having the related item identifier 914 and that was previously associated with the coverage area graphic 2102 (and each of its coverage zone graphic components 2102A and 2102B) in accordance with the disclosed embodiments. Thus, the disclosed embodiments, enable a related item of a monitoring device (e.g., such as represented by "camera 1" 1801 in FIG. 24) to be quickly and conveniently associated with other building devices that are selectively associated with the same coverage area graphic 2102 representing the coverage zones (or corresponding coverage zone graphic components 2102A and 2102B depicted in FIG. 23) of the applicable monitoring devices.

FIGS. 4-24 are intended as illustrations of elements of various embodiments of the present disclosure and are not meant to imply physical or architectural limitations to the manner in which different illustrative embodiments may be implemented. For example, different coverage area graphics may be generated in association with different building graphic layouts, different monitoring devices may be associated with a coverage area graphic using different symbols, and different building devices represented by different symbols may be associated with the coverage area graphic to automatically assign related items of the monitoring devices to the building devices associated with the same coverage area graphic.

FIGS. 25A-25E illustrate a flowchart of a process 2500 for defining a coverage area associated with one or more monitoring devices in the management system in relation to a pre-defined space in a building, identifying devices located within the coverage area, and displaying related items associated with one or more of the devices in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system identifying a building layout having one or more pre-defined spaces or rooms (step 2501) and displaying a graphical representation of the building layout (step 2502). The system may identify a building layout having one or more pre-defined spaces or rooms from a user selecting a building graphic identifier from a hierarchical structure of building graphic identifiers that may be stored in database 124 and displayed in the system browser pane 304 of the graphic user interface 300. For example, using a mouse, pointing device or other known input technique, the user may select the building graphic identifier corresponding to the building graphic 302. In this example, the system may then display the graphical representation of the building layout having one or spaces or rooms represented by the building graphic 302 in the primary pane 306 of the graphic user interface 300 as shown in FIG. 3.

Next, the system receives a request to generate a coverage area graphic to be associated with one or more spaces/rooms and one or more monitoring devices (step 2504) and receives an identification of the pre-defined space or room (step 2506). As described in detail herein, in one embodiment, the system may receive a request to generate a coverage area graphic (e.g., 402) to be associated with one or more monitoring devices via the graphical user interface (e.g., 300, 400) of the system upon a user selection of a graphic element icon (e.g., 404). In this embodiment, the system may receive an identification of the pre-defined space or room from a user using a cursor of a mouse (or other pointing device) to select the coverage area graphic 402, drag the coverage area graphic 402 over the space or room 450 and release the mouse to signal to the system of the identification of the space or room 450. In another embodiment, the system may receive a request to generate a coverage area graphic to be associated with one or more monitoring devices via the graphical user interface (e.g., 1100, 1800) upon a user selection of the monitoring device object identifier (e.g., 310, 1811) and a separate selection of the space or room 450 of the building graphic 302 to be associated with the coverage area graphic, where the selection of the space or room 450 also signals the identification of the space or room 450 to the system.

The system may also identify the dimensions of the identified space or room (step 2508). The system may identify the dimensions of the space or room 450 from properties stored in association with the building graphic 302 or provided in a related configuration file associated with the building floor layout represented by the building graphic 302 that is stored in database 124 or memory 208 for access by the system.

The system receives an identification of a first monitoring device (step 2510). For example, the system may receive an identification of a first monitoring device upon a user selection of a first (e.g., 310, 1811) of the monitoring device object identifiers displayed by the system via the system browser pane 304 of the graphical user interface of the system. The system may then identify a first coverage zone associated with the first monitoring device (step 2512). In one embodiment, the system may access the monitoring device object (e.g., building device object 250A in FIG. 2) identified by the selected monitoring device object identifier (e.g., 310, 1811) to retrieve the "coverage zone" property that identifies a corresponding coverage range and volume associated with the monitoring device.

The system also receives a location of the first monitoring device relative to the identified space or room (step 2514), for example, via a user selection of the space or room represented in the building graphic 302 or user identification of the location within the space or room of the building graphic when dragging and dropping the corresponding monitoring device identifier in the space or room 450 to be associated with the coverage area graphic.

Next, the system determines whether the coverage area is to be user defined (step 2516). If the system determines that the coverage area is be user defined, the system then generates and displays a graphical representation of coverage area based on default dimensions (step 2518). For example, when the system receives a request to generate a coverage area graphic upon a user selection of a graphic element icon (e.g., 404) of the graphic user interface, the system recognizes that the coverage area is not yet associated with a monitoring device selected by the user from the hierarchical structure of device object identifiers displayed in the system browser pane 304 of the graphical user interface. In this example, the system may then display a coverage area graphic 402 having default dimensions as shown in the example embodiment in FIG. 4. The system may also receive user inputs for defining dimensions or modifications to the coverage area graphic (step 2520), and modify and display coverage area graphic over building layout based on identified space/room and user inputs (step 2522). For example, the system enables the user to use manipulation points (e.g., 502, 505 and 506 in FIG. 5) of the coverage area graphic 402 to change the dimensions of the coverage area graphic to fit or be within a selected space or room 450 of the building graphic 302 before associating or assigning a monitoring device and its symbol to the building graphic 302.

The system also displays a symbol corresponding to first monitoring device over the building layout or graphic based on received location of the first monitoring device relative to the identified space or room (step 2524) as shown, for example, in the embodiment depicted in FIG. 6. The system may then determine if the coverage area graphic, as modified by the user, exceeds the first coverage zone of the first monitoring device (step 2526). For example, as previously described herein, the system may access the "coverage zone" property of the monitoring device object (e.g., building device object 250A in FIG. 2) identified by the selected monitoring device object identifier (e.g., 310, 1811) to verify the size and dimensions of a coverage zone graphic of the corresponding monitoring device are within the user defined coverage area graphic 402. If the system determines that the coverage area graphic 402 exceeds the first coverage zone of the first monitoring device, the system modifies the coverage area graphic 402 based on the first coverage zone of the first monitoring device (step 2528), and displays the modified coverage area graphic relative to identified space/room 450 (step 2530) before continuing processing at step 2544.

If the system determines that the coverage area is not to be user defined in step 2516, then the system displays the symbol corresponding to first monitoring device over the building layout or graphic based on the received location of the first monitoring device relative to the identified space or room (step 2532) and displays a graphical representation of the first coverage zone of the first monitoring device based on the received location (step 2534). As previously described herein, in one embodiment, when the system receives a request to generate a coverage area graphic based on a user selecting a monitoring device object identifier (e.g., object identifier 310 corresponding to "camera 1" in FIG. 11) from the hierarchical structure of device object identifiers displayed in the system browser pane or window 304 of the graphic user interface 1100, and then dragging and dropping the selected object identifier within a selected space or room 450 of the building graphic 302, the system recognizes that the coverage area is not to be user defined initially, and displays the coverage zone graphic 1104 at the user identified location within the space or room 450. The system may also determine whether the first coverage zone of the first monitoring device exceeds any dimension of the selected space or room (step 2536). For example, as described in detail herein, the system may access the "coverage zone" property of the monitoring device object (e.g., building device object 250A in FIG. 2) identified by the selected monitoring device object identifier (e.g., 310, 1811) to verify the size and dimensions of a coverage zone graphic of the corresponding monitoring device are within the dimensions of the selected room or space 450. If the system determines that the first coverage zone of the first monitoring device does not exceed any dimension of the selected space or room, the system generates the graphical representation of the coverage area (e.g., 1202 or 1902) based on the first coverage zone of the first monitoring device (e.g., as represented by the first coverage zone graphic 1102 or 1802) before continuing processing at step 2542 (step 2538). Alternatively, if the system determines that the first coverage zone of the first monitoring device exceeds a dimension of the selected space or room, the system generates the graphical representation of the coverage area (e.g., 1202 or 1902) based on first coverage zone modified to not exceed the dimension of the selected or identified space or room (step 2540). Once the graphical representation of the coverage area (i.e., the coverage area graphic 1202 or 1902) is generated in step 2538 or step 2540, the system displays the coverage area graphic based on the first coverage zone of the first monitoring device (as represented by its monitoring device symbol 602 or 1801) relative to the identified space or room (step 2542) before continuing processing at step 2544.

The system may also store the identification of the first monitoring device (or corresponding data object) as a property of the coverage area graphic (step 2544). For example, the system may display a graphic properties editor 324 in a corresponding pane or window 308 of the graphic user interface to enable a user to edit the identification of the monitoring device object stored in the "coverage area reference" 426 property of the coverage area graphic 402.

Next, the system may determine if another or second monitoring device with a second coverage area is to be associated with the same coverage area graphic (step 2546). In one embodiment, the system may determine that another or second monitoring device is to be associated with the same coverage area graphic, when the system receives a user selection of another or second monitoring device object identifier before saving the coverage area graphic associated with the first monitoring device. If it is determined that another or second monitoring device is not to be associated with the same coverage area graphic, the system may continue processing at step 2570.

If it is determined that another or second monitoring device is to be associated with the same coverage area graphic, the system receives the identification of other monitoring device (step 2548). For example, the system may receive the identification of the other or second monitoring device when a user selects the object identifier (e.g., 310) associated with the second monitoring device from the hierarchical structure of device object identifiers (e.g., 1822) that may be displayed by the system in the system browser pane or window 304 as depicted in FIG. 20. The system may then identify the second coverage zone associated with the other monitoring device (step 2550) by, for example, accessing the "coverage zone" property of the corresponding monitoring device object (e.g., 250F in FIG. 2).

The system also receives the location of other monitoring device relative to identified space or room (step 2552). In one embodiment, the system receives the location of the other or second monitoring device by the user dragging and dropping the corresponding object identifier (e.g., 1811) of the other or second monitoring device on the same coverage area graphic (e.g., 1802) associated with the first monitoring device (as represented by the symbol 1801 in FIG. 20).

The system then displays the symbol corresponding to other monitoring device over the building layout or graphic based on the received location (step 2554), and displays the graphical representation of the second coverage zone of other monitoring device based on received location (step 2556), for example, as depicted and described in reference to the illustrative embodiment in FIG. 20.

The system next determines whether the second coverage zone of the other monitoring device exceeds any dimension of the selected space or room (step 2558) in a manner similar as described herein for determining if the first coverage zone of the first monitoring device exceeds any dimension of the same selected space or room.

If the system determines that the second coverage zone of the second monitoring device does not exceed any dimension of the selected space or room, the system generates the graphical representation of the coverage area (e.g., 2102A and 2102B) based on the first coverage zone of the first monitoring device (e.g., as represented by the first coverage zone graphic 1802) and the second coverage zone of the second monitoring device (e.g., as represented by the second coverage zone graphic 1102) before continuing processing at step 2564 (step 2560). Alternatively, if the system determines that the second coverage zone of the second monitoring device does exceed a dimension of the selected space or room, the system generates the graphical representation of the coverage area (e.g., 1202 or 1902) based on the first coverage zone of the first monitoring device (e.g., as represented by the first coverage zone graphic 1802) and the second coverage zone of the second monitoring device (e.g., as represented by the second coverage zone graphic 1102)

modified to not exceed the dimension of the selected or identified space or room (step 2562). Once the graphical representation of the collective coverage area (i.e., the collective coverage area graphic 2102A and 2102B) is generated in step 2560 or step 2562, the system displays the coverage area graphic relative to the identified space or room (step 2564). The system may also display the graphic representation of at least the second or other coverage zone (e.g., 2102B) relative to the collective coverage area graphic (e.g., 2102A and 2102B) (step 2566) as best depicted in FIG. 21.

In addition, the system may store the identification of second monitoring device (or corresponding data object) as a property of the coverage area graphic (step 2568). For example, the system may display a graphic properties editor 324 in a corresponding pane or window 308 of the graphic user interface to enable a user to edit the identification of the second monitoring device object stored in the "coverage area reference" property of the coverage area graphic.

Next, the system receives an identification of a building device that is or may be installed in the building (step 2570), identifies a location of the device relative to the coverage area (step 2572), and displays a symbol representing the device relative to the coverage area graphic based on the identified location (step 2574). For example, in accordance with the embodiments disclosed herein, a user may select one of the object identifiers 702-708 in the system browser pane 304 for placement on the displayed coverage area graphic (e.g., 402, 1202 or 2102A&B). In performing this input technique, the system receives via the graphic user interface the identification of the device corresponding to the selected object identifier, and the user selected location of the respective identified device relative to the coverage area corresponding to the coverage area graphic. In response, the system generates (or retrieves from the symbol library in database 124) the symbol (e.g., 712) representing the identified device (e.g., corresponding to the object identifier 702) and displays via the graphic user interface the building device symbol at the user selected location relative to the coverage area graphic.

Next, the system determines whether the identified device is in the coverage area as represented by the coverage area graphic (step 2576). If it is determined that the identified device is not in the coverage area, the system continues processing at step 2586. If it is determined that the identified device is in the coverage area, the system may store the identification of the current device (or corresponding data object) as a property of the coverage area graphic (step 2578) and/or store the identification of the coverage area graphic (or corresponding data object) as a property of the current device (step 2580). In addition, the system retrieves each related item identifier of each monitoring device associated with the coverage area graphic (step 2582) and stores each related item identifier of each monitoring device associated with the coverage area graphic as a property of the data object corresponding to the current device (step 2584).

The system may then determines whether there are more devices selected by the user to be associated with the coverage area graphic corresponding to the previously identified one or more monitoring devices (step 2586). If it is determined that there are more selected devices, the system continues processing at step 2576 to verify that the respective selected device is in the coverage area before automatically assigning a related item identifier of an identified monitoring device to the selected device.

If it is determined that there are no more selected devices, the system determines whether operating mode is selected (step 2588). If it is determined that operating mode is not selected, the system may end process 2500 or repeat the process if prompted by the user via the graphical user interface to remain in editor mode.

If it is determined that operating mode is selected, the system displays the respective symbol for each device associated with the coverage area graphic in association with graphical representation of the building layout or graphic (step 2590), for example as described for the disclosed embodiments and depicted in reference to FIGS. 9, 15 and 22.

Next, the system determines whether a device symbol displayed in association with the coverage area graphic has been selected (step 2592), for example, by a user using a mouse or other pointing device to click on the device symbol (e.g., 712, 714, 716 or 714) displayed within the coverage area graphic (e.g., 402, 1202 or 2102A&B). If it is determined that a device symbol is not selected, the system may end process 2500 or repeat the process or wait until a device symbol is selected. If it is determined that a device symbol is selected, the system displays the related item identifier of each monitoring device associated with the selected device symbol (step 2594). For example, the system may display the related item identifier 914 or 2214 in a separate pane 904 from the pane 306 in which the building graphic 302 having the selected space or room 450 is displayed with monitoring device symbol 602 and/or 1801 and other identified building device symbols 712-718 associated with the coverage area graphic 402, 1202 or 2102A&B as described for the disclosed embodiments and depicted in reference to FIGS. 9, 15 and 22.

The system then determines whether the monitoring device related item identifier is selected (step 2596), for example, by a user using a mouse or other pointing device to click on the monitoring device related item identifier (e.g., 914 or 2214). If it is determined that the monitoring device related item identifier is not selected, the system may end process 2500 or repeat the process or wait until a related item identifier is selected.

If it is determined that the monitoring device related item identifier is selected, the system displays the related item (e.g., 1004) corresponding to selected monitoring device related item identifier (step 2598), for example as described for the disclosed embodiments and depicted in reference to FIGS. 10, 17 and 24.

The system may also determine whether the coverage area for a monitoring device associated with the coverage area graphic is selected (step 2600), for example, by a user selecting a location in the space or room 450 of the building graphic associated with or covered by the coverage area graphic 402, 1202 or 2102A&B. If it is determined that the coverage area for a monitoring device associated with the coverage area graphic is selected, the system may again display the coverage area graphic for the monitoring device in association with symbols of devices associated with the coverage area (step 2602) so that the user is able to visually reconfirm the coverage area graphically represented by the coverage area graphic 402, 1202 or 2102A&B and the building devices and monitoring devices associated with the coverage area graphic.

The system may then determine whether to end the process or continue processing at step 2592 (step 2604).

Thus, a system consistent with the disclosed embodiments enables a user to quickly and easily define a coverage area graphic associated with one or more monitoring devices in the management system in relation to a pre-defined space in a building and identify devices located within the coverage area so that the user using the system may subsequently identify and display related items associated with the devices in accordance with disclosed embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method in a data processing system for displaying graphics, the method comprising:
    displaying a graphical representation of a layout of a building having one or more spaces;
    receiving a request to generate a coverage area graphic associated with one or more monitoring devices;
    generating the coverage area graphic, generating the coverage area graphic comprises receiving user inputs defining dimensions for the coverage area graphic, and modifying the coverage area graphic based on the user inputs;
    displaying the coverage area graphic relative to the graphical representation of the layout of the building;
    identifying a device having a data point to be monitored by the data processing system;
    determining whether the identified device is in the coverage area represented by the coverage area graphic;
    in response to determining that the identified device is in the coverage area, storing a related item identifier associated with the one or more monitoring devices in association with an object corresponding to the identified device;
    receiving a selection for the identified device;
    in response to receiving the selection for the identified device, displaying the related item identifier associated with the one or more monitoring devices;
    receiving an identification of a first of the one or more monitoring devices;
    identifying a coverage zone associated with the first monitoring device;
    determining whether the coverage area exceeds the coverage zone; and
    in response to determining the coverage area does not exceed the coverage zone, modifying the coverage area graphic based on the coverage zone, and displaying the modified coverage area graphic relative to the graphical representation of the layout of the building.

2. A method in a data processing system for displaying graphics, the method comprising:
    displaying a graphical representation of a layout of a building having one or more spaces;
    receiving a request to generate a coverage area graphic associated with one or more monitoring devices;
    generating the coverage area graphic;
    displaying the coverage area graphic relative to the graphical representation of the layout of the building;
    identifying a device having a data point to be monitored by the data processing system;
    determining whether the identified device is in the coverage area represented by the coverage area graphic;
    in response to determining that the identified device is in the coverage area, storing a related item identifier associated with the one or more monitoring devices in association with an object corresponding to the identified device;
    receiving a selection for the identified device;
    in response to receiving the selection for the identified device, displaying the related item identifier associated with the one or more monitoring devices;
    receiving an identification of one of the one or more spaces of the building;
    identifying dimensions of the identified space;
    receiving an identification of a first of the one or more monitoring devices; and
    identifying a first coverage zone associated with the first monitoring device,
    wherein generating the coverage area graphic comprises:
        determining whether the first coverage zone exceeds an identified dimension of the identified space, and
        in response to determining that the first coverage zone exceeds an identified dimension of the identified space, generating the coverage area graphic based on the first coverage zone modified to not exceed the identified dimension of the identified space.

3. The method of claim 2, further comprising:
    receiving a location of the first monitoring device relative to the identified space;
    displaying a symbol corresponding to the first monitoring device over the graphical representation of the building layout based on the received location; and
    displaying a graphical representation of the coverage zone associated with the first monitoring device based on the received location.

4. The method of claim 2, further comprising:
    receiving an identification of a second monitoring device to associate with the coverage area graphic; and
    identifying a second coverage zone associated with the second monitoring device, wherein generating the coverage area graphic further comprises:
  determining whether the second coverage zone exceeds any one of the identified dimensions of the identified space, and
  in response to determining that the second coverage zone exceeds one of the identified dimensions of the identified space, generating the coverage area graphic based on the first coverage zone and the second coverage zone modified to not exceed the one identified dimension of the identified space.

5. The method of claim 4, further comprising:
receiving a second location of the second monitoring device relative to the identified space;
displaying a second symbol corresponding to the second monitoring device over the graphical representation of the building layout based on the received second location; and
displaying a graphical representation of the second coverage zone associated with the second monitoring device based on the received second location.

6. The method of claim 4, wherein displaying a graphical representation of the second coverage zone associated with the second monitoring device based on the received second location comprises displaying the second coverage zone to be visually distinguishable from the coverage area graphic.

7. The method of claim 4, wherein in response to determining that the identified device is in the coverage area, storing a related item identifier associated with the one or more monitoring devices in association with an object corresponding to the identified device comprises:
  storing a first related item identifier associated with the first monitoring device in association with the object corresponding to the identified device; and
  storing a second related item identifier associated with the second monitoring device in association with the object corresponding to the identified device, and
  wherein, in response to receiving the selection for the identified device, displaying the first and the second related item identifiers.

8. A data processing system configured to display graphics,
the data processing system comprising:
  a storage device comprising a system manager application;
  a memory comprising instructions of the system manager application; and
  a processor having a communication connection to the memory and configured to execute the instructions of the system manager application to:
  display a graphical representation of a layout of a building having one or more spaces;
  receive a request to generate a coverage area graphic associated with one or more monitoring devices;
  generate the coverage area graphic;
  display the coverage area graphic relative to the graphical representation of the layout of the building;
  identify a device having a data point to be monitored by the data processing system;
  determine whether the identified device is in the coverage area represented by the coverage area graphic;
  in response to determining that the identified device is in the coverage area, store a related item identifier associated with the one or more monitoring devices in association with an object corresponding to the identified device;
  receive a selection for the identified device;
  in response to receiving the selection for the identified device, display the related item identifier associated with the one or more monitoring devices;
  receive an identification of one of the one or more spaces of the building;
  identify dimensions of the identified space;
  receive an identification of a first of the one or more monitoring devices;
  identify a first coverage zone associated with the first monitoring device, and
  to generate the coverage area graphic comprises, the processor is further configured to execute the instructions of the system manager application to:
  determine whether the first coverage zone exceeds an identified dimension of the identified space, and
  in response to determining that the first coverage zone exceeds an identified dimension of the identified space, generate the coverage area graphic based on the first coverage zone modified to not exceed the identified dimension of the identified space.

9. The method of claim 8, wherein:
the processor is further configured to execute the instructions of the system manager application to:
receive a location of the first monitoring device relative to the identified space;
display a symbol corresponding to the first monitoring device over the graphical representation of the building layout based on the received location; and
display a graphical representation of the coverage zone associated with the first monitoring device based on the received location.

10. The method of claim 8, wherein:
the processor is further configured to execute the instructions of the system manager application to:
receive an identification of a second monitoring device to associate with the coverage area graphic;
identify a second coverage zone associated with the second monitoring device, and
to generate the coverage area graphic, the processor is further configured to execute the instructions of the system manager application to:
determine whether the second coverage zone exceeds any one of the identified dimensions of the identified space, and
in response to determining that the second coverage zone exceeds one of the identified dimensions of the identified space, generate the coverage area graphic based on the first coverage zone and the second coverage zone modified to not exceed the one identified dimension of the identified space.

11. The method of claim 10, wherein:
the processor is further configured to execute the instructions of the system manager application to:
receive a second location of the second monitoring device relative to the identified space;
display a second symbol corresponding to the second monitoring device over the graphical representation of the building layout based on the received second location; and
display a graphical representation of the second coverage zone associated with the second monitoring device based on the received second location.

12. The method of claim 10, wherein:
to display a graphical representation of the second coverage zone associated with the second monitoring device based on the received second location, the processor is further configured to execute the instructions of the system manager application to:

display the second coverage zone to be visually distinguishable from the coverage area graphic.

13. The method of claim 10, wherein:

in response to determining that the identified device is in the coverage area, to store a related item identifier associated with the one or more monitoring devices in association with an object corresponding to the identified device, the processor is further configured to execute the instructions of the system manager application to:

store a first related item identifier associated with the first monitoring device in association with the object corresponding to the identified device; and store a second related item identifier associated with the second monitoring device in association with the object corresponding to the identified device, and in response to receiving the selection for the identified device, the processor is further configured to execute the instructions of the system manager application to:

display the first and the second related item identifiers.

14. The computer-readable medium of claim 10, wherein the computer-readable medium is further encoded with executable instructions that, when executed, cause one or more data processing systems to:

receive a selection of the related item identifier; and display the related item corresponding to the selected related item identifier.

\* \* \* \* \*